(12) United States Patent
Hu et al.

(10) Patent No.: US 11,766,907 B2
(45) Date of Patent: Sep. 26, 2023

(54) ROAD-RAIL DUAL-PURPOSE VEHICLE

(71) Applicant: CRRC YANGTZE CO., LTD., Wuhan (CN)

(72) Inventors: Haiping Hu, Wuhan (CN); Hui Luo, Wuhan (CN); Danyan Liu, Wuhan (CN); Ruijin Jiang, Wuhan (CN); Fengwei Liu, Wuhan (CN); Ziming Li, Wuhan (CN); Xianhong Peng, Wuhan (CN); Xiong Yao, Wuhan (CN); Zhiying Xiang, Wuhan (CN); Xiannian Wu, Wuhan (CN); Chunyu Huang, Wuhan (CN)

(73) Assignee: CRRC YANGTZE CO., LTD., Wuhan (CN)

( * ) Notice: Subject to any disclaimer, the term of this patent is extended or adjusted under 35 U.S.C. 154(b) by 584 days.

(21) Appl. No.: 16/975,335

(22) PCT Filed: Apr. 12, 2019

(86) PCT No.: PCT/CN2019/082436
§ 371 (c)(1),
(2) Date: Aug. 24, 2020

(87) PCT Pub. No.: WO2020/019763
PCT Pub. Date: Jan. 30, 2020

(65) Prior Publication Data
US 2020/0406696 A1    Dec. 31, 2020

(30) Foreign Application Priority Data

Jul. 27, 2018    (CN) .......................... 201810846327.9
Jul. 27, 2018    (CN) .......................... 201821211150.7

(51) Int. Cl.
*B60F 1/04*     (2006.01)
*B60F 1/00*     (2006.01)
(Continued)

(52) U.S. Cl.
CPC ................ *B60F 1/046* (2013.01); *B60F 1/00* (2013.01); *B60F 1/02* (2013.01); *B60F 1/04* (2013.01);
(Continued)

(58) Field of Classification Search
CPC .... B60F 1/00; B60F 1/02; B60F 1/005; B60F 1/04; B60F 1/046; B60F 1/043;
(Continued)

(56) References Cited

U.S. PATENT DOCUMENTS 4,342,264 A * 8/1982 Hindin ................. B60G 17/052
                                                      105/215.2
4,448,132 A * 5/1984 Beatty .................... B60F 1/046
                                                      105/215.2

(Continued)

FOREIGN PATENT DOCUMENTS

CN          106394144 A  *  2/2017   ................ B60F 1/00

*Primary Examiner* — Zachary L Kuhfuss
*Assistant Examiner* — James William Jones
(74) *Attorney, Agent, or Firm* — Platinum Intellectual Property PC

(57) ABSTRACT

The present disclosure discloses a road-rail dual-purpose vehicle, comprising a vehicle frame (1), and a lifting airbag mounting seat (1c) is provided between two longitudinal beams (1a) of the vehicle frame (1); a load-bearing airbag insertion hole is formed in a lower cover plate (1a1) of the longitudinal beam (1a); a load-bearing airbag mounting seat (1d) is installed in the load-bearing airbag insertion hole, and a bearing bolster (1e) is installed on an outer side of the longitudinal beam (1a). The road-rail dual-purpose vehicle is suitable for transportation.

21 Claims, 19 Drawing Sheets

(51) Int. Cl.
*B60F 1/02* (2006.01)
*B61D 3/16* (2006.01)
(52) U.S. Cl.
CPC ............... *B60F 1/005* (2013.01); *B60F 1/043* (2013.01); *B61D 3/16* (2013.01)
(58) Field of Classification Search
CPC ........ B61D 40/00; B61D 47/005; B61D 3/16; B61D 3/166; B60G 2300/042; B60W 2300/145; B62D 53/06; B60Y 2200/148
USPC ..................................................... 105/215.2
See application file for complete search history.

(56) References Cited

U.S. PATENT DOCUMENTS

| | | | | |
|---|---|---|---|---|
| 4,783,096 | A * | 11/1988 | Ramsey | B62D 17/00 |
| | | | | 280/86.757 |
| 4,817,537 | A * | 4/1989 | Cripe | B61D 3/12 |
| | | | | 105/418 |
| 5,016,544 | A * | 5/1991 | Woollam | B60F 1/043 |
| | | | | 105/72.2 |
| 5,058,916 | A * | 10/1991 | Hicks | B62D 61/12 |
| | | | | 180/209 |
| 8,215,240 | B2 * | 7/2012 | Graaff | B61D 3/184 |
| | | | | 105/215.1 |
| 2011/0139031 | A1 * | 6/2011 | Larson, Jr. | B60F 1/046 |
| | | | | 105/215.2 |
| 2015/0202935 | A1 * | 7/2015 | Muthusamy | B60B 17/00 |
| | | | | 105/72.2 |
| 2019/0359020 | A1 * | 11/2019 | Krols | B61J 3/12 |

* cited by examiner

ROAD-RAIL DUAL-PURPOSE VEHICLE

CROSS REFERENCES TO RELATED APPLICATIONS

This application claims the priorities of Chinese Patent Application No. 201810846327.9, filed with the China Patent Office on Jul. 27, 2018, and Chinese Patent Application No. 201821211150.7, filed with the China Patent Office on Jul. 27, 2018, each of which is incorporated herein by reference in its entirety.

TECHNICAL FIELD

The present disclosure relates to the technical field of road transportation, and in particular to a road-rail dual-purpose vehicle.

BACKGROUND OF THE PRESENT DISCLOSURE

With the development of transportation capacity, cargo owners have increasingly higher requirements for the timeliness of delivery of goods. Countries are continuously putting effort to increase speed of goods delivery by rail, striving to achieve an advantage in speed of goods delivery, and gradually forming a "door to door" transportation represented by container transportation.

At present, one of the main ways to realize "door-to-door" transportation is a combined road-rail transportation of containers. The transportation process is as follows: firstly, containers are transported by road vehicles from distribution centers to railway container collection stations, then transported by railway to container distribution stations, and finally transported by road vehicles to container collection yards. Containers of transportations by road are generally carried by road container semi-trailers, and containers of transportations by railway are generally carried by container flat cars or gondola cars.

The road-rail dual-purpose vehicle developed in recent years adopts a three-car train set consisting of three road container semi-trailers, a primary traction-bolster arrangement, a secondary traction-bolster arrangement, an air-hand brake device, a coupler draft gear and two independent bogies. When the road-rail dual-purpose vehicle is used for railway transportation, ends of the road container semi-trailers at both ends of the three-car train set are connected with the primary traction-bolster arrangement and the secondary traction-bolster arrangement, respectively, and the coupler draft gear and the bogie are respectively installed at an end and a lower part of the traction-bolster arrangement; the bogie is installed on a lower part of the middle portion of the road container semi-trailer, and an air-hand brake device is installed on the primary traction-bolster arrangement. In this way, a rail transportation of the road-rail dual-purpose vehicle can be realized. When the road-rail dual-purpose vehicle is used for road transportation, the road container semi-trailers are separated from the primary and secondary traction-bolster arrangement and are connected with a road tractor to form a combination vehicle to realize road transportation.

This type of road-rail dual-purpose vehicle has a split structure, and has the following problems in actual use:

1. When changing from road transportation to railway transportation, it is necessary to provide a primary traction-bolster arrangement, a secondary traction-bolster arrangement and a bogie. When changing from railway transportation to road transportation, it is necessary to remove the primary traction-bolster arrangement, the secondary traction-bolster arrangement and the bogie, which greatly increases transfer time.

2. A transfer between a road transportation mode and a railway transportation mode of the road-rail dual-purpose vehicle needs to be carried out in a dedicated site, and a forklift for carrying the bogie is needed correspondingly; the transfer site must have a hardened road bed suitable for the length of the road-rail dual-purpose vehicle, and a surface of the hardened road bed must have a same height as a track surface and be transited easily to the ground; moreover, the railway stations participating in road-to-rail transfer need to set up a dedicated storage site for the traction-bolster arrangement with bogies. Thus, the number of railway stations used for road-rail transfer will be greatly limited.

SUMMARY OF THE INVENTION

The present disclosure is intended to overcome the disadvantages in the prior art and provides a road-rail dual-purpose vehicle.

In a first aspect, one or more embodiments of the present disclosure provides a road-rail dual-purpose vehicle, comprising a vehicle frame, a suspension and a single-axle bogie, wherein the vehicle frame comprises two longitudinal beams arranged in parallel; the two longitudinal beams are connected by a longitudinal beam connection plate, and a lifting airbag mounting seat is provided between the two longitudinal beams; a load-bearing airbag insertion hole is formed in a lower cover plate of the longitudinal beams at a position corresponding to the lifting airbag mounting seat; a load-bearing airbag mounting seat is installed in the load-bearing airbag insertion hole, and a bearing bolster is installed on the outer side of the longitudinal beam;

The suspension comprises an axle assembly; a lifting airbag is installed in the middle portion of the axle assembly at a front end thereof, and a primary load-bearing airbag is installed on either side of the axle assembly at a rear end thereof; a secondary load-bearing airbag is installed on a top surface of each of two primary load-bearing airbags through a supporting seat; a top surface of the lifting airbag is installed on the lifting airbag mounting seat, and a top surface of the secondary load-bearing airbag is installed in the load-bearing airbag mounting seat;

The single-axle bogie comprises a framework, and an axle box is installed on a bottom surface of the framework at each end thereof; a wheel-axle assembly is installed between two axle boxes, and a primary damping spring assembly is provided between the axle box and the framework; a brake assembly is installed at each of two ends of the bottom surface of the framework at a position corresponding to a wheel of the wheel-axle assembly; a vehicle frame connection assembly is provided at each of two ends of a top surface of the framework, and the framework is installed on the bottom surface of the bearing bolster through the vehicle frame connection assembly.

The single-axle bogie is fixedly installed on the vehicle frame through the vehicle frame connection assembly, and the suspension is designed as a two-stage load-bearing airbag with a large stroke, so that when changing from railway transportation to road transportation, the single-axle bogie can be lifted away from a rail surface directly through the suspension with large-stroke without assistance of other apparatus, which greatly reduces transfer time; at the same time, because the road-rail dual-purpose vehicle of the present disclosure does not need other apparatus to assist in the transfer, the road-rail dual-purpose vehicle just need to carry out road-rail transfer at a railway station with a hardened road bed suitable for a length of the road-rail dual-purpose vehicle, and a surface of the hardened road bed has a same height as a track surface and transited easily to the ground, which greatly reduces the difficulty of road-rail transfer at railway stations; moreover, the bearing bolster not only plays a role of carrying containers, but also plays a role of connecting the vehicle frame and the single-axle bogie; finally, the secondary load-bearing airbag is installed in the longitudinal beam through the load-bearing airbag mounting seat, which can increase the stroke of the suspension while making the structure of the road-rail dual-purpose vehicle more compact.

In some embodiments of the present disclosure, the load-bearing airbag mounting seat comprises an airbag mounting plate and two oppositely arranged airbag partition plates; inner surfaces of upper ends of the two airbag partition plates are respectively welded to opposite sides of the airbag mounting plate; the load-bearing airbag mounting seat is inserted into the load-bearing airbag insertion hole, and the load-bearing airbag mounting seat and two webs of the longitudinal beam enclose a load-bearing airbag mounting cavity for installing the secondary load-bearing airbag; the airbag mounting plate is arranged in parallel with an upper cover plate of the longitudinal beam, and lower ends of the two airbag partition plates are respectively welded to the lower cover plate of the longitudinal beam; the lower ends of the two airbag partition plates are also respectively welded to the two webs of the longitudinal beam, and guide grooves protruding outward are provided at middle portions of the two airbag partition plates in a vertical direction; the supporting seat is provided with bearing seat guide parts at two sides thereof respectively, and the bearing seat guide parts cooperate with the guide grooves; the upper cover plate of the longitudinal beam is formed with the load-bearing airbag mounting hole at a position corresponding to the load-bearing airbag mounting seat; a top surface of the secondary load-bearing airbag is installed on the airbag mounting plate, and the bearing seat guide part is movably inserted in a corresponding guide groove. Mutual cooperation between the bearing seat guide part and the guide groove can ensure the longitudinal and lateral positioning of the load-bearing airbag, and make the load-bearing airbag run stably.

In some embodiments of the present disclosure, the lifting airbag mounting seat comprises a lifting airbag mounting plate and two lifting airbag mounting reinforcement plates; the two lifting airbag mounting reinforcement plates are installed in parallel between the two longitudinal beams; the lifting airbag mounting plate is installed on the two lifting airbag mounting reinforcement plates, and the lifting airbag mounting plate is welded to the two longitudinal beams. Two lifting airbag installation reinforcement plates ensure stability of installation of the lifting airbag.

In some embodiments of the present disclosure, a U-shaped bogie connection seat is provided on a bottom surface of the bearing bolster, and a bogie connection long hole is formed in a bottom surface of the bogie connection seat in a longitudinal direction. Both ends of the bogie connection seat are respectively provided with a bogie limiting clamping plate, and a center plate filler for installing a center plate pin of the single-axle bogie is provided between the two longitudinal beams at a position corresponding to the bearing bolster. The vehicle frame connection assembly comprises one vehicle frame connection plate, and an upwardly protruding vehicle frame limiting connection seat is provided at a middle portion of the vehicle frame connection plate; the vehicle frame limiting connection seat is of a square cavity structure, and a vehicle frame connection long hole is formed in a top surface of the vehicle frame limiting connection seat in a longitudinal direction. An I-shaped connection member is inserted in and limited by the vehicle frame connection long hole. An upper connection head of the I-shaped connection member is inserted in and limited by the bogie connection long hole, and two ends of the upper connection head of the I-shaped connection member are fixedly connected to the bogie connection seat respectively. The vehicle frame limiting connection seat which is of a square cavity structure is clamped between the two bogie limiting clamping plates, and the center plate pin on the framework is inserted into the center plate filler.

The U-shaped bogie connection seat provided on the bottom surface of the bearing bolster facilitates the connection of the vehicle frame connection assembly; at the same time, the cooperation between the bogie limiting clamping plates and the vehicle frame limiting connection seat prevents excessive rotation of the bogie, and further ensures reliability of connection between the vehicle frame and the single-axle bogie; in addition, the center plate filler can ensure transmission of longitudinal traction force and longitudinal braking force of the train, and further ensure reliability of connection between the vehicle frame and the single-axle bogie.

In some embodiments of the present disclosure, a secondary rubber spring assembly is clamped on each of two longitudinal ends of the vehicle frame connection plate, and the secondary rubber spring assembly comprises a secondary rubber spring mounting plate and a secondary rubber spring. A lower end of the secondary rubber spring is clamped on the vehicle frame connection plate, and an upper end of the secondary rubber spring is vulcanized on the secondary rubber spring mounting plate. The secondary rubber spring assembly can play a role of attenuating a vertical dynamic force on the one hand, and also play a role for supporting the vehicle body and cargo on the other hand.

In some embodiments of the present disclosure, a U-shaped secondary rubber spring connection seat is provided on a bottom surface of the bearing bolster at a position corresponding to the secondary rubber spring mounting plate, and a bottom surface of the secondary rubber spring connection seat is connected with the secondary rubber spring mounting plate. By providing a U-shaped secondary rubber spring connection seat on the bottom surface of the bearing bolster, it is convenient to install and fix the secondary rubber spring mounting plate.

In some embodiments of the present disclosure, a top surface of the bogie connection seat and a top surface of the secondary rubber spring connection seat are provided with reinforcement connection ribs respectively; the reinforcement connection ribs are also welded to a bottom surface of the bearing bolster, and an outer side wall of the bogie limiting clamping plate is also provided with the reinforcement rib. By providing the reinforcement connection ribs on the top surface of the bogie connection seat and the top surface of the secondary rubber spring connection seat respectively, and welding the reinforcement connection ribs to the bottom surface of the bearing bolster, and then providing the reinforcement ribs on the outer side wall of the bogie limiting clamping plate, a structural strength of the bogie connection seat can be ensured, which further improves reliability of connection between the vehicle frame and the single-axle bogie.

In some embodiments of the present disclosure, the brake assembly comprises a unit brake and a brake vertical mounting plate; an upper end of the brake vertical mounting plate is installed on a bottom surface of the framework at a position corresponding to a wheel of the wheel-axle assembly; the unit brake is installed on a lower end of the brake vertical mounting plate, and a brake shoe of the unit brake is arranged facing toward the wheel of the wheel-axle assembly. By adopting the unit brake as the brake, the arrangement of a brake pipeline can be effectively simplified, the structure is more compact, and the installation is more convenient.

In some embodiments of the present disclosure, the bearing bolster comprises a bearing bolster upper cover plate, a bearing bolster lower cover plate, a bearing bolster sealing plate, bearing bolster webs, and bearing bolster partition plates. The bearing bolster upper cover plate and the bearing bolster lower cover plate are arranged up and down in parallel with each other, and the bearing bolster upper cover plate and the bearing bolster lower cover plate are connected by the bearing bolster webs arranged at intervals in a longitudinal direction. Two adjacent bearing bolster webs are connected by the bearing bolster partition plates, and an inner side of the bearing bolster lower cover plate and an inner side of the bearing bolster upper cover plate are both connected to an outer web of the longitudinal beam; an outer side of the bearing bolster upper cover plate and an outer side of the bearing bolster lower cover plate are connected by the bearing bolster sealing plate.

In some embodiments of the present disclosure, the center plate filler comprises a center plate seat upper cover plate, a center plate seat lower cover plate, center plate seat webs, center plate seat partition plates, and a center plate seat central tube. The center plate seat upper cover plate and the center plate seat lower cover plate are arranged up and down in parallel with each other, and the center plate seat upper cover plate and the center plate seat lower cover plate are connected by the center plate seat webs arranged at intervals along a longitudinal direction. An upper end of the center plate seat central tube is connected to a middle portion of a bottom surface of the center plate seat upper cover, and a lower end of the center plate seat central tube is connected at a middle portion of a top surface of the center plate seat lower cover plate. A center plate pin insertion hole is formed in the center plate seat lower cover plate at a position corresponding to a lower port of the center plate seat central tube, and two longitudinal sides of the center plate seat upper cover plate are respectively connected to inner webs of the two longitudinal beams. Two longitudinal sides of the center plate seat lower cover plate are respectively connected to lower cover plates of the two longitudinal beams, and an outer wall of the center plate seat central tube is connected to the center plate seat webs by the center plate seat partition plates; the outer wall of the center plate seat central tube is also connected to the inner webs of the two longitudinal beams by the center plate seat partition plates.

By providing the center plate seat partition plates between the outer wall of the center plate seat central tube and the center plate seat webs, and providing the center plate seat partition plates between the outer wall of the center plate seat central tube and the inner webs of the two longitudinal beams, the strength of the center plate filler is greatly improved.

In some embodiments of the present disclosure, a coupler seat is provided between front ends of the two longitudinal beams, and a tight-lock coupler is installed inside the coupler seat through a coupler pin. By providing the coupler seat between the front ends of the two longitudinal beams, and installing the tight-lock coupler in the coupler seat through the coupler pin, the connection between the two vehicle bodies is facilitated.

In some embodiments of the present disclosure, the tight-lock coupler comprises a coupler body and a coupler knuckle, and the coupler body has an internal cavity of coupler body at a position corresponding to a coupler head of the coupler body; the internal cavity of coupler body comprises a coupler head connection cavity and a coupler knuckle rotation cavity, and the coupler knuckle is rotatably installed in the coupler knuckle rotation cavity. The tight-lock coupler also comprises an operating lever, a return spring and a return spring mounting bolt, and an end of the operating lever is connected to the coupler knuckle; a middle portion of the operating lever is connected to one end of the return spring, and another end of the return spring is connected to the return spring mounting bolt. The return spring mounting bolt is installed on the coupler body, and a coupler tail of the coupler body is provided with a coupler connection pin hole cooperating with the coupler pin. The coupler tail of the coupler body is installed in the coupler seat through the coupler connection pin hole and the coupler pin.

By manually operating the operating lever to achieve coupling and decoupling of the tight-lock coupler, it can not only meet the marshalling requirements of freight vehicles, but also greatly reduce the cost; at the same time, the coupler tail of the coupler body is installed in the coupler seat directly through the coupler connection pin hole and the coupler pin, so that the structure of the tight-lock coupler is simple, compact, safe and reliable.

In some embodiments of the present disclosure, a handle is provided at another end of the operating lever. The handle facilitates the operation of the operating lever.

In some embodiments of the present disclosure, an operating lever locking rod with an operating lever locking slot is provided at a middle portion of the operating lever, and the coupler body is provided with an operating lever locking pin cooperating with the operating lever locking slot.

By providing the operating lever locking rod with the operating lever locking slot at the middle portion of the operating lever, and providing the operating lever locking pin on the coupler body, the operating lever locking pin can restrict the rotation of the coupler knuckle pulled by the return spring when the tight-lock coupler is decoupled, which can realize a direct separation of the two couplers and facilitate the decoupling of the tight-lock coupler.

In some embodiments of the present disclosure, an end of the operating lever connected to the coupler knuckle is provided with a thread, and the threaded end of the operating lever passes through the coupler knuckle and is connected to the coupler knuckle by a nut.

In some embodiments of the present disclosure, an anti-rotation bump is provided on the operating lever at a position corresponding to the thread, and the coupler knuckle is provided with an anti-rotation slot cooperating with the anti-rotation bump at a corresponding position. The anti-rotation bump can effectively prevent the operating lever from rotating, thereby further facilitating the operation.

In some embodiments of the present disclosure, a return spring connection pin is provided at a middle portion of the operating lever, and the operating lever is connected to the return spring through the return spring connection pin. The return spring is installed by adopting the structure of the return spring connection pin, which facilitates assembly and maintenance of the return spring.

In some embodiments of the present disclosure, the road-rail dual-purpose vehicle further comprises a tight-lock coupler support assembly; two ends of the tight-lock coupler support assembly are connected to front ends of the two longitudinal beams respectively, and the tight-lock coupler is supported on a middle portion of the tight-lock coupler support assembly. The tight-lock coupler support assembly improves reliability of connection and stability of the tight-lock coupler.

In some embodiments of the present disclosure, the tight-lock coupler support assembly comprises a supporting front end plate, a U-shaped supporting beam, two supporting beam mounting seats and two supporting springs. Two ends of the supporting front end plate are respectively installed on the front end faces of the two longitudinal beams, and the two bracket mounting seats are respectively installed on the two ends of the supporting front end plate correspondingly. The two supporting springs are respectively installed in the two supporting beam mounting seats through supporting pins. Two ends of the supporting beam are respectively press-fitted on the upper ends of the two supporting springs. The tight-lock coupler is supported on the supporting beam. The supporting spring can effectively play a role of supporting and adjusting the height of the coupler.

In some embodiments of the present disclosure, an inner web of the longitudinal beam at the rear end thereof is provided with a front draft lug and a rear draft lug respectively; a coupler anti-creep plate is provided between the two longitudinal beams at a position above the front draft lug and the rear draft lug, and a coupler draft gear is installed between the front draft lug and the rear draft lug. The coupler draft gear facilitates the connection between the vehicle bodies.

In some embodiments of the present disclosure, a rear end plate is installed on rear end surfaces of the two longitudinal beams, and the rear end plate is installed with an impact seat assembly for supporting the coupler draft gear. The impact seat assembly improves reliability of connection and stability of the coupler draft gear.

In some embodiments of the present disclosure, the impact seat assembly comprises a U-shaped impact seat body and a coupler draft gear supporting beam; the impact seat body is installed on the rear end plate, and an opening of the impact seat body is arranged facing downward; the coupler draft gear supporting beam is installed at the opening of the impact seat body, and the coupler draft gear rests on the coupler draft gear supporting beam. By designing the impact seat body in a U-shaped structure and sealing with the coupler draft gear supporting beam, installation and disassembly of the coupler draft gear are facilitated.

Figure 1:
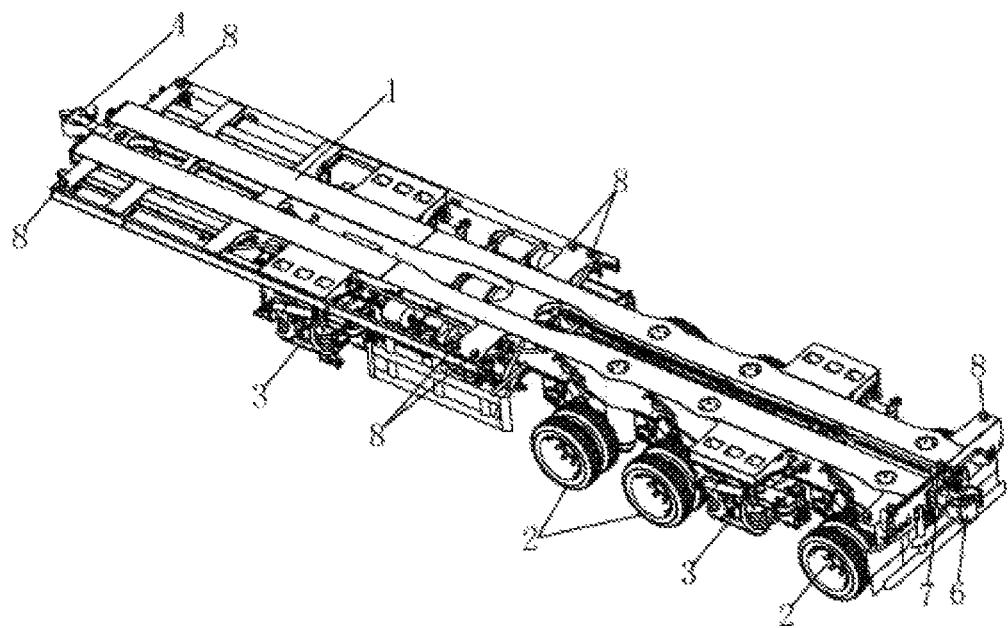
FIG. 1 is a schematic structural diagram of the assembly structure of a road-rail dual-purpose vehicle according to one or more embodiments of the present disclosure.
Figure 2:
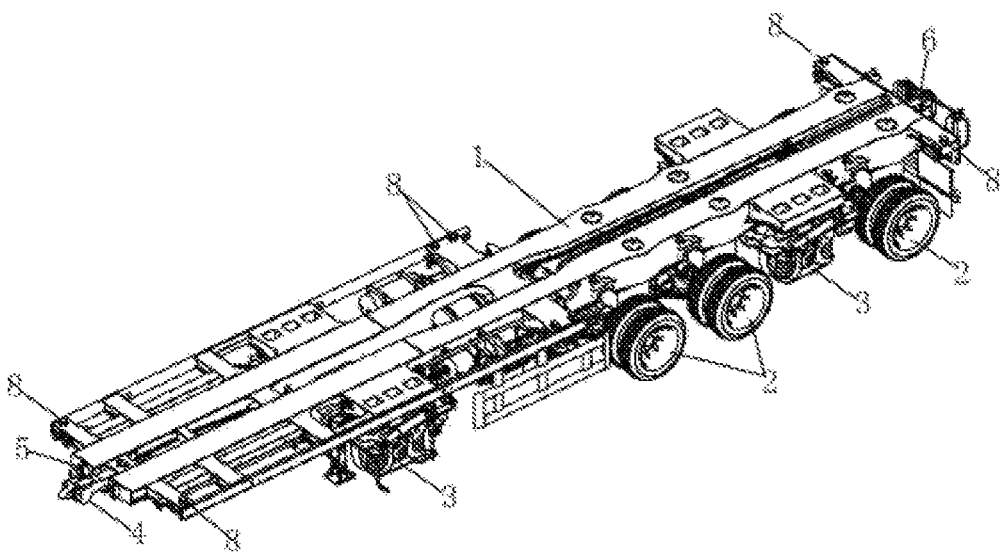
FIG. 2 is a schematic structural diagram of FIG. 1 from another viewing angle.
Figure 3:
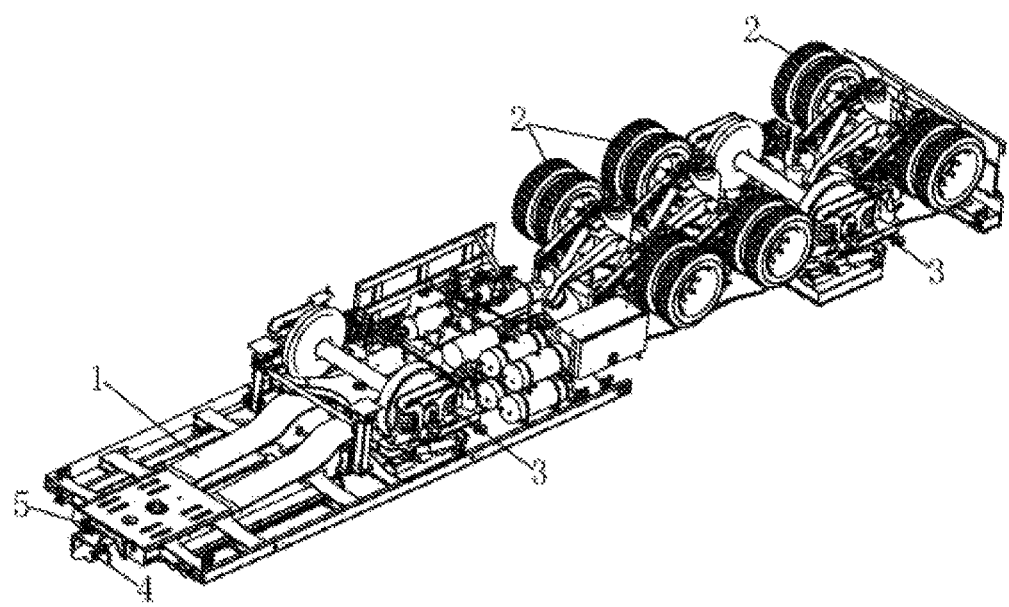
FIG. 3 is a schematic structural diagram of FIG. 1 from yet another viewing angle.
Figure 4:
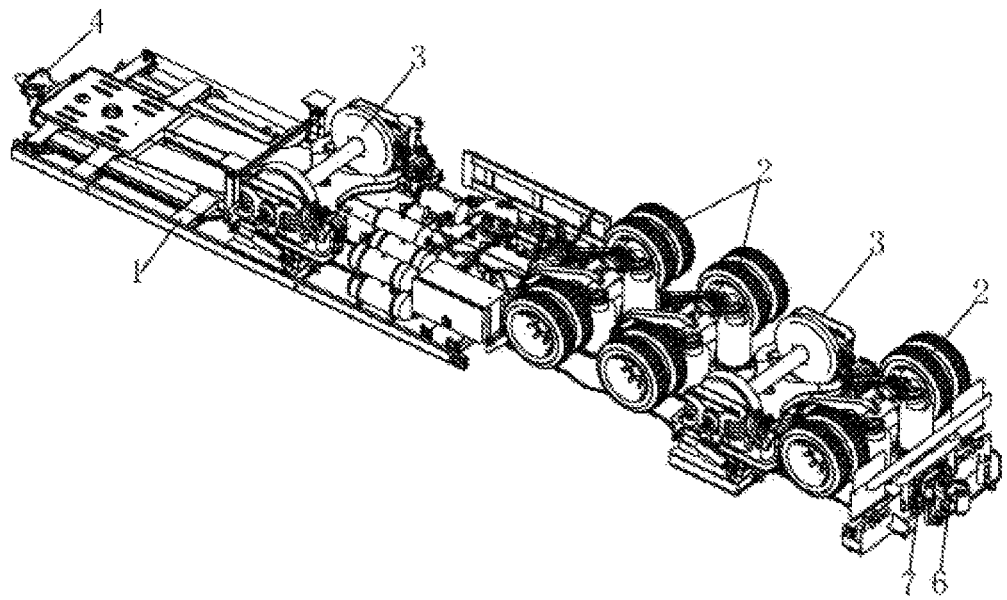
FIG. 4 is a schematic structural diagram of FIG. 1 from a further viewing angle.

Reference numerals in the Figures are listed as below:
1—vehicle frame; 1a—longitudinal beam; 1a1—lower cover plate of the longitudinal beam; 1a2—webs of longitudinal beam; 1a3—upper cover plate of the longitudinal beam; 1b—longitudinal beam connection plate; 1c—lifting airbag mounting seat; 1c1—lifting airbag mounting plate; 1c2—lifting airbag mounting reinforcement plate; 1d—load-bearing airbag mounting seat; 1d1—airbag mounting plate; 1d2—airbag partition plate; 1d3—guiding groove; 1e—bearing bolster; 1e1—bearing bolster upper cover plate; 1e2—bearing bolster lower cover plate; 1e3—bearing bolster sealing plate; 1e4—bearing bolster web; 1e5—bearing bolster partition plate; 1f—bogie connection seat; 1f1—reinforcing connection ribs; 1g—bogie limiting clamping plate; 1g1—bogie limiting clamping ridges; 1h—center plate filler; 1h1—center plate seat upper cover plate; 1h2—center plate seat lower cover plate; 1h3—center plate seat web; 1h4—center plate seat partition plate; 1h5—center plate seat central tube; 1h6—center plate pin insertion hole; 1i—secondary rubber spring connection seat; 1j—coupler seat; 1k—front draft lug; 1m—rear draft lug; 1n—coupler anti-creep plate; 1p—rear end plate; 1q—bearing beam; 1r—connection beam; 1s—side beam; 1t—reinforcement beam; 2—suspension; 2a—axle assembly; 2b—lifting airbag; 2c—primary load-bearing airbag; 2d—supporting seat; 2d1—supporting seat guide part; 2e—secondary load-bearing airbag; 3—single-axle bogie; 3a—framework; 3a1—center plate pin; 3b—axle box; 3c—wheel-axle assembly; 3d—primary damping spring assembly; 3e—brake assembly; 3e1—unit brake; 3e2—brake vertical mounting plate; 3f—vehicle frame connection assembly; 3f1—vehicle frame connection plate; 3f2—vehicle frame limiting connection seat; 3f3—vehicle frame connection long hole; 3f4—I-shaped connection member; 3g—secondary rubber spring assembly; 3g1—secondary rubber spring mounting plate; 3g2—secondary rubber spring; 4—tight-lock coupler; 4a—coupler body; 4b—coupler knuckle; 4c—internal cavity of coupler body; 4c1 coupler head connection cavity; 4c2—coupler knuckle rotation cavity; 4d—operating lever; 4e—return spring; 4f—return spring mounting bolt; 4g—coupler connection pin hole; 4h—handle; 4i—operating lever locking slot; 4j—operating lever locking rod; 4k—operating lever locking pin; 4m—anti-rotation bump; 4n—return spring connection pin; 5—tight-lock coupler support assembly; 5a—supporting front end plate; 5b—supporting beam; 5c—supporting beam mounting seat; 5d—supporting spring; 6—coupler draft gear; 7—impact seat assembly; 7a—impact seat body; 7b—coupler draft gear supporting beam; 8—container locking device.

DETAILED DESCRIPTION OF THE INVENTION

In order to make the objectives, technical solutions and advantages of present disclosure clearer, embodiments of present disclosure will be described in detail with reference to accompanying drawings.

As shown in FIGS. 1 to 35, a road-rail dual-purpose vehicle according to one or more embodiments of the present disclosure comprises a vehicle frame 1, a suspension 2 and a single-axle bogie 3. The vehicle frame 1 comprises two longitudinal beams 1a arranged in parallel with each other, and the two longitudinal beams 1a are connected by a longitudinal beam connection plate 1b. A lifting airbag mounting seat 1c is provided between the two longitudinal beams 1a; a load-bearing airbag insertion hole is formed in a lower cover plate 1a1 of the longitudinal beam 1a at a position corresponding to the lifting airbag mounting seat 1c, and a load-bearing airbag mounting seat 1d is installed in the load-bearing airbag insertion hole. A bearing bolster 1e is installed on an outer side of the longitudinal beam 1a.

As shown in FIGS. 21-24, the suspension 2 comprises an axle assembly 2a. A lifting airbag 2b is installed in a middle portion of the axle assembly 2a at a front end thereof, and a primary load-bearing airbag 2c is respectively installed on both sides of the axle assembly 2a at a rear end thereof. A secondary load-bearing airbag 2e is installed on a top surface of each of two primary load-bearing airbags 2c through a supporting seat 2d. A top surface of the lifting airbag 2b is installed on the lifting airbag mounting seat 1c, and a top surface of the secondary load-bearing airbag 2e is installed in the load-bearing airbag mounting seat 1d.

Figure 25:
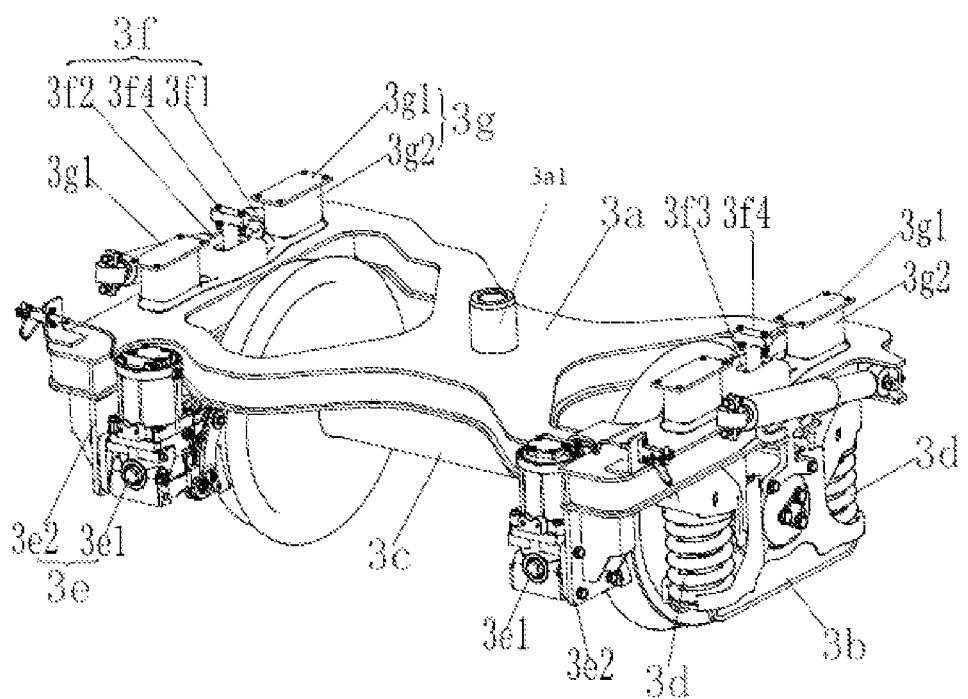
FIG. 25 is a schematic structural diagram of a single-axle bogie.
Figure 26:
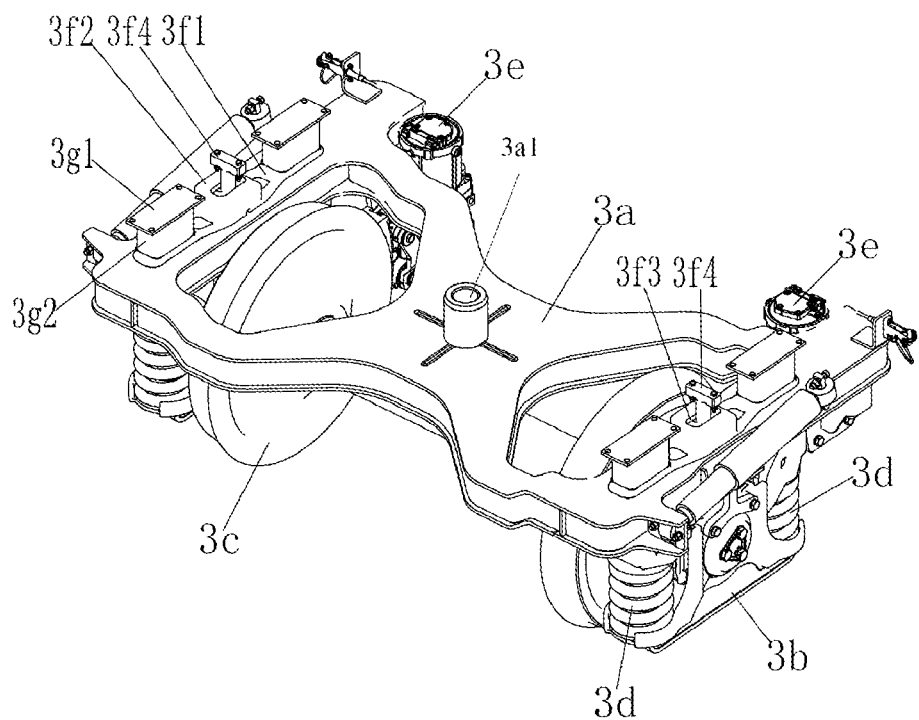
FIG. 26 is a schematic structural diagram of FIG. 25 from another viewing angle.
Figure 27:
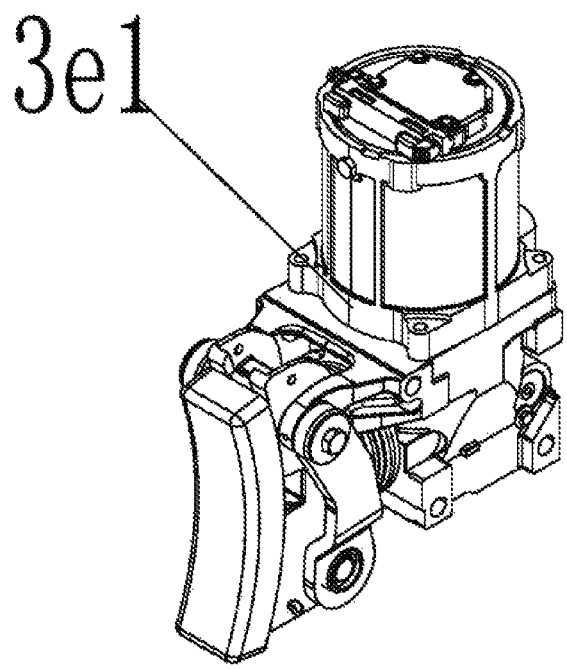
FIG. 27 is a schematic structural diagram of a brake assembly.
Figure 28:
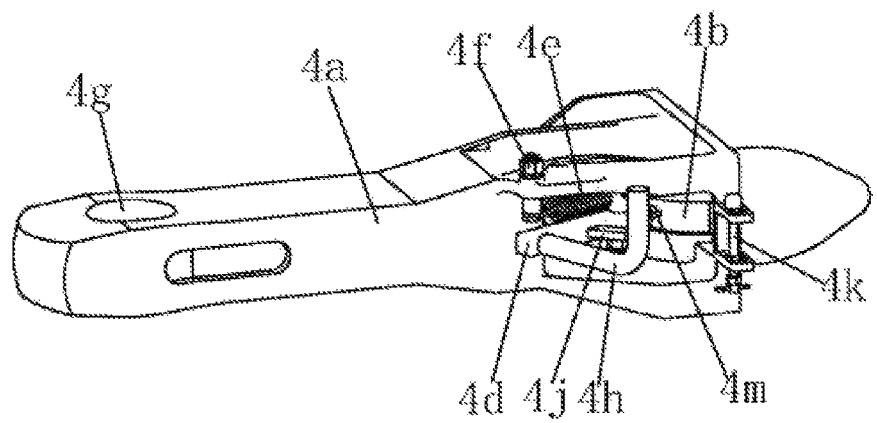
FIG. 28 is a schematic structural diagram of a tight-lock coupler.
Figure 29:
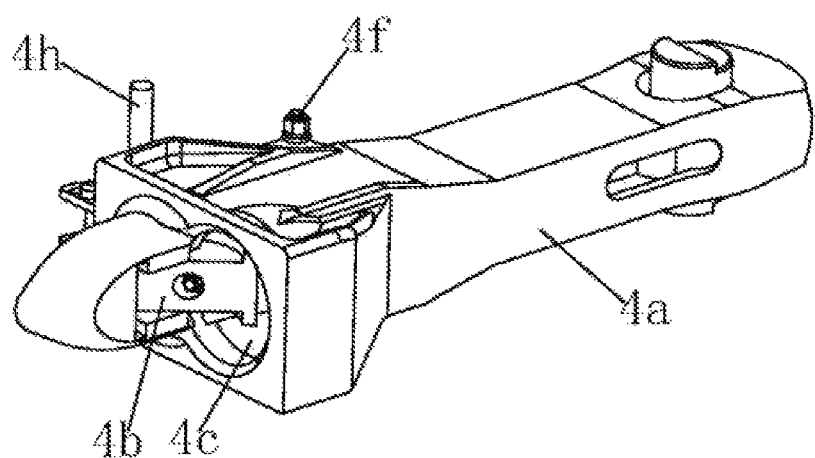
FIG. 29 is a schematic structural diagram of FIG. 28 from another viewing angle.
Figure 30:
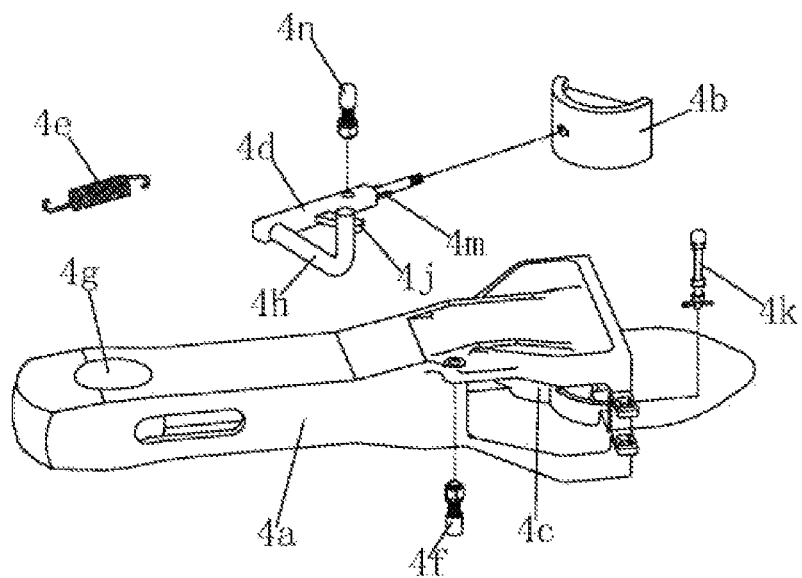
FIG. 30 is a schematic diagram of exploded structure of a tight-lock coupler.
Figure 31:
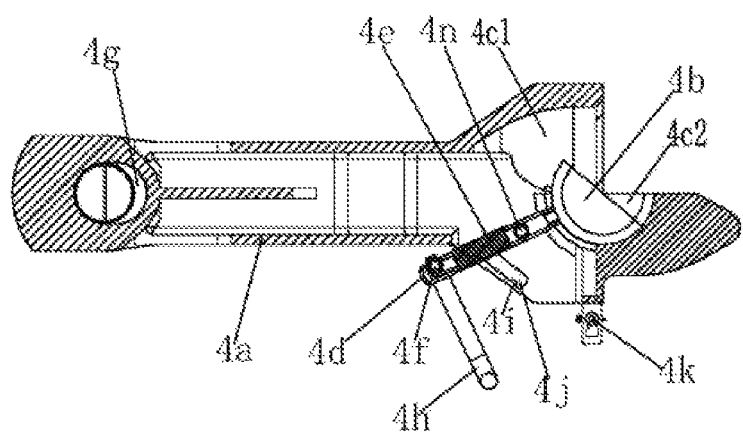
FIG. 31 is a schematic sectional diagram of the tight-lock coupler.
Figure 32:
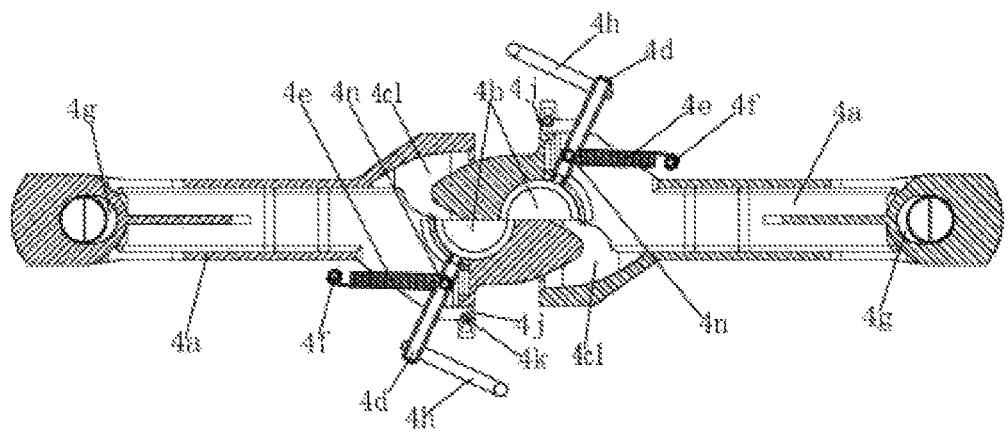
FIG. 32 is a schematic structural diagram showing an initial state during the coupling of two tight-lock couplers.
Figure 33:
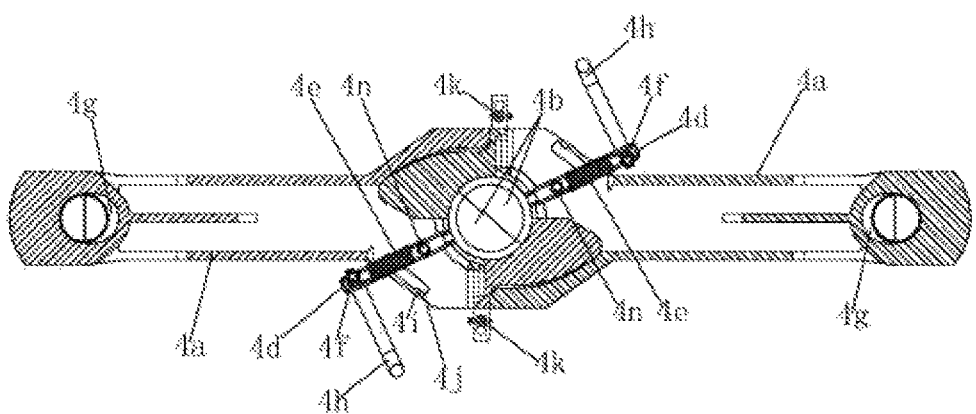
FIG. 33 is a schematic structural diagram showing a state after the coupling of two tight-lock couplers is finished.
Figure 34:
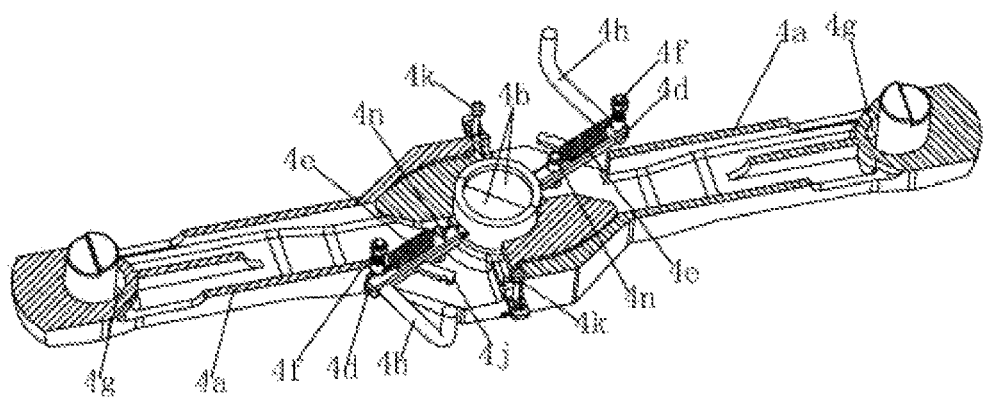
FIG. 34 is an isometric view of FIG. 33.
Figure 35:
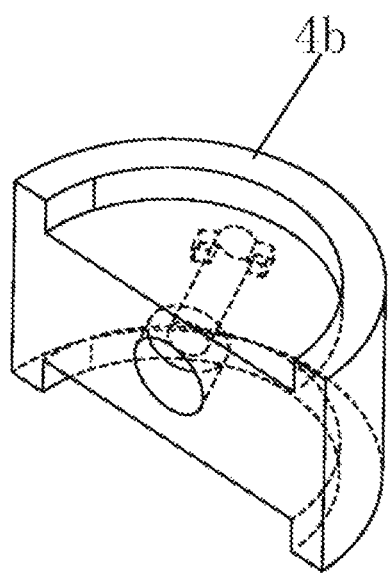
FIG. 35 is a schematic structural diagram of a coupler knuckle.

As shown in FIGS. 25-27, the single-axle bogie 3 comprises a framework 3a, and an axle box 3b is installed on a bottom surface of the framework 3a at each end thereof; a wheel-axle assembly 3c is installed between the two axle boxes 3b. A primary damping spring assembly 3d is provided between the axle box 3b and the framework 3a, and a brake assembly 3e is installed at each of two ends of the bottom surface of the framework 3a at a position corresponding to a wheel of the wheel-axle assembly 3c. A vehicle frame connection assembly 3f is provided at each of two ends of a top surface of the framework 3a, and the framework 3a is installed on a bottom surface of the bearing bolster 1e through the vehicle frame connection assembly 3f.

The single-axle bogie 3 is fixedly installed on the vehicle frame 1 through the vehicle frame connection assembly 3f, and the suspension 2 is designed as a two-stage load-bearing airbag with a large stroke, so that when changing from railway transportation to road transportation, the single-axle bogie 3 can be lifted away from a rail surface directly through the suspension 2 with large-stroke without assistance of other apparatus, which greatly reduces transfer time. At the same time, because the road-rail dual-purpose vehicle of the present disclosure does not need other apparatus to assist in the transfer, the road-rail dual-purpose vehicle just need to carry out road-rail transfer at a railway station with a hardened road bed suitable for the length of the road-rail dual-purpose vehicle, and a surface of the hardened road bed has a same height as a track surface and transited easily to the ground, which greatly reduces the difficulty of road-rail transfer at railway stations. Moreover, the bearing bolster 1e not only plays a role of carrying containers, but also plays a role of connecting the vehicle frame 1 and the single-axle bogie 3. Finally, the secondary load-bearing airbag 2e is installed in the longitudinal beam 1a through the load-bearing airbag mounting seat 1d, which can increase the stroke of the suspension 2 while making the structure of the road-rail dual-purpose vehicle more compact.

There are a total of four bearing bolsters 1e. Every two of bearing bolsters 1e form a group, and each of the groups is installed with one single-axle bogie 3 correspondingly. In some embodiments of the present disclosure, there are a total of two single-axle bogies 3; one lifting airbag mounting seat 1c and two load-bearing airbag mounting seats 1d form a group, and each of the groups is installed with one suspension 2 correspondingly. In some embodiments of the present disclosure, there are a total of three suspensions 2. A bearing beam 1q is also installed on an outer side of the longitudinal beam 1a, and the bearing beam 1q and the bearing bolsters 1e are alternately installed on the longitudinal beam 1a in a longitudinal direction. A connection beam 1r is also installed between the bearing beam 1q at a front end of the longitudinal beam 1a and the bearing bolster 1e. An outer side of the bearing beams 1q at the front end of the longitudinal beam 1a, an outer side of the bearing bolsters 1e, and the connection beam 1r are connected to a side beam 1s. There are reinforcement beams 1t between the bearing beam 1q at the front end of the longitudinal beam 1a and the connection beams 1r as well as between two adjacent connection beams 1r. Container locking devices 8 are installed on a top surface of the bearing beams 1q. Other structures of the vehicle frame 1 can be found in Chinese Patent 201610988706.2 entitled "road-rail dual-purpose vehicle", which will not be repeated here.

Figure 5:
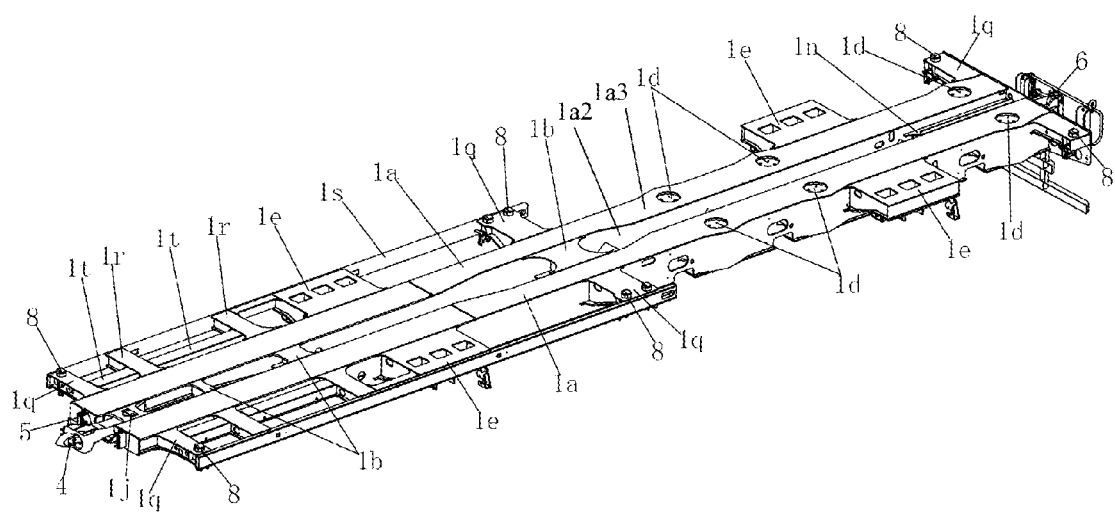
FIG. 5 is a schematic structural diagram of a vehicle frame with a tight-lock coupler and a coupler draft gear.
Figure 5A:
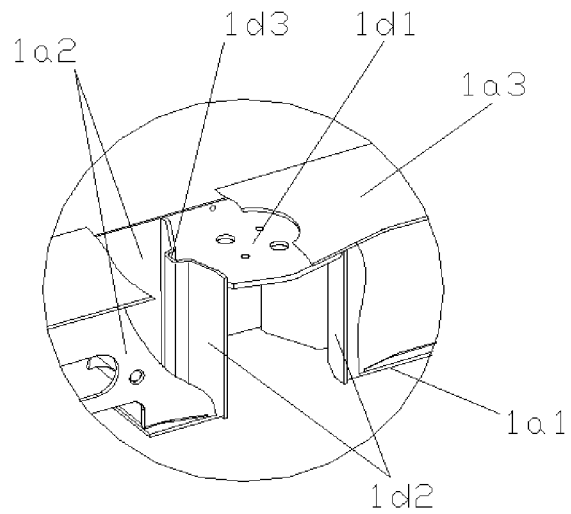
FIG. 5a is an enlarged structural diagram of the vicinity of the load-bearing airbag mounting seat in FIG. 5.
Figure 7:
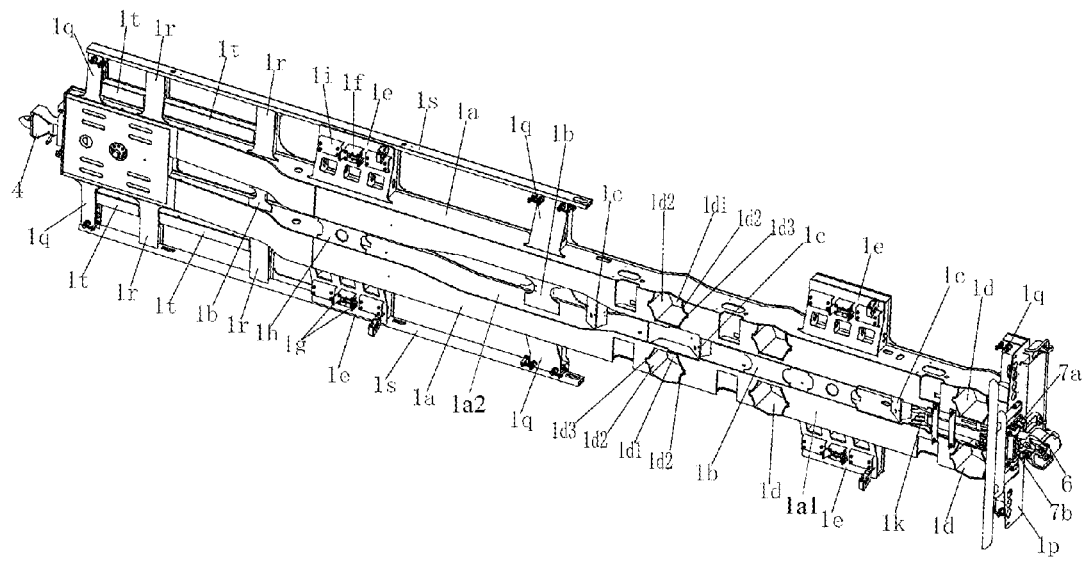
FIG. 7 is a schematic structural diagram of FIG. 5 from yet another viewing angle.
Figure 8:
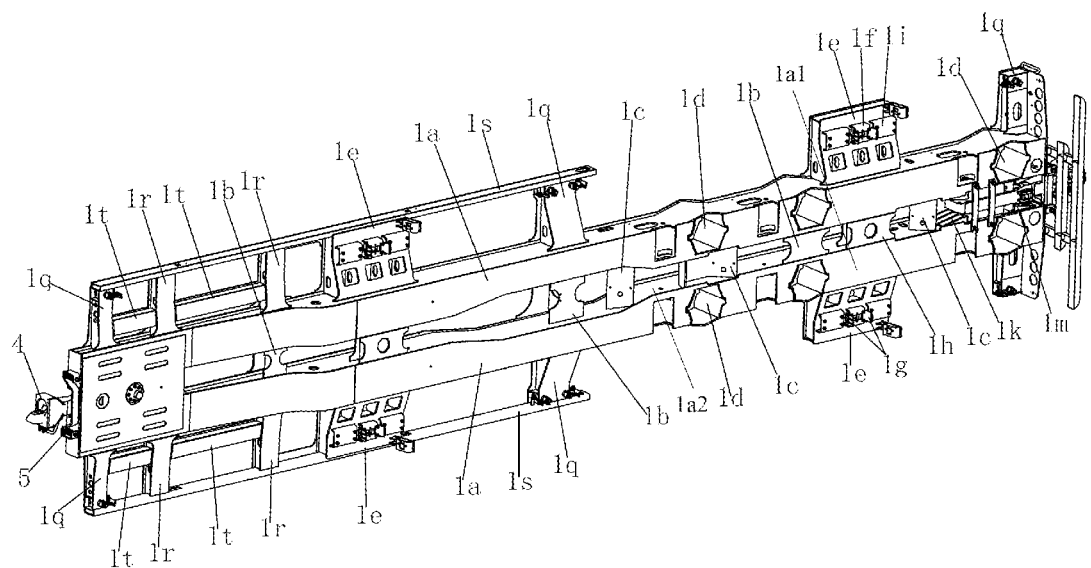
FIG. 8 is a schematic structural diagram of FIG. 5 from a further viewing angle.
Figures 9, 10:
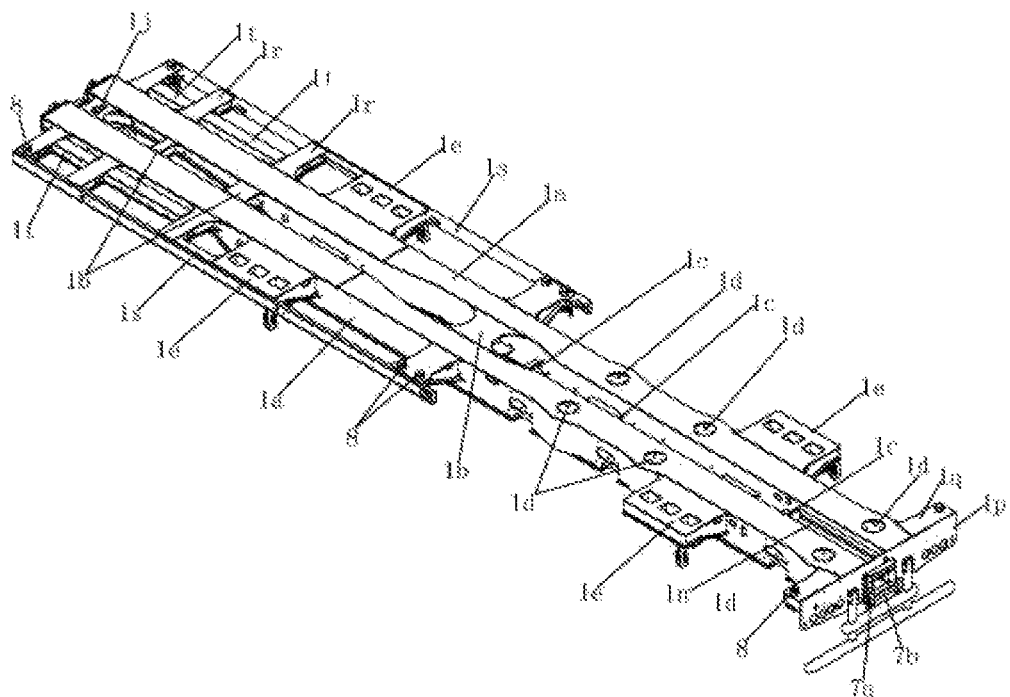
FIG. 9 is a schematic structural diagram of a vehicle frame.
FIG. 10 is a schematic structural diagram of FIG. 9 from another viewing angle.
Figure 11:
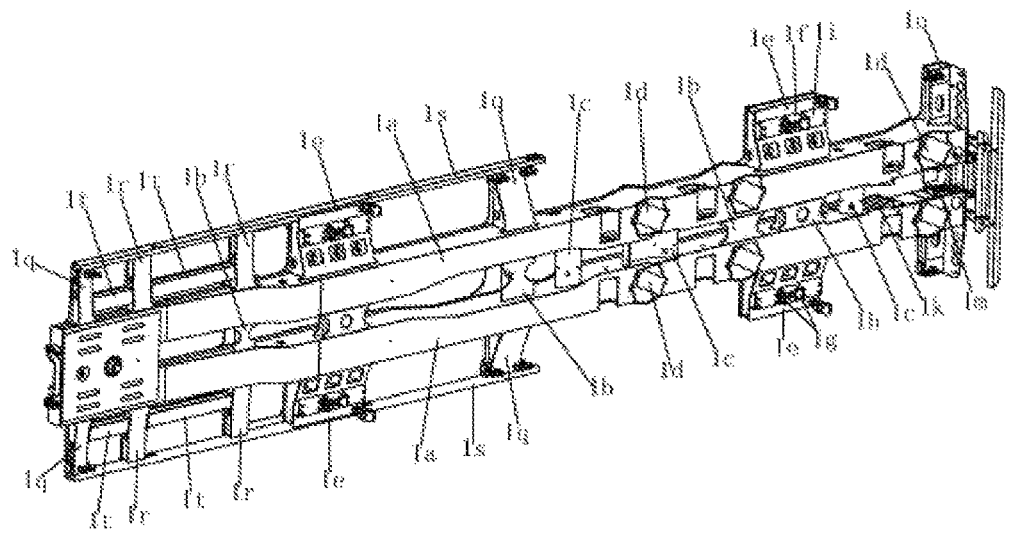
FIG. 11 is a schematic structural diagram of FIG. 9 from yet another viewing angle.
Figure 12:
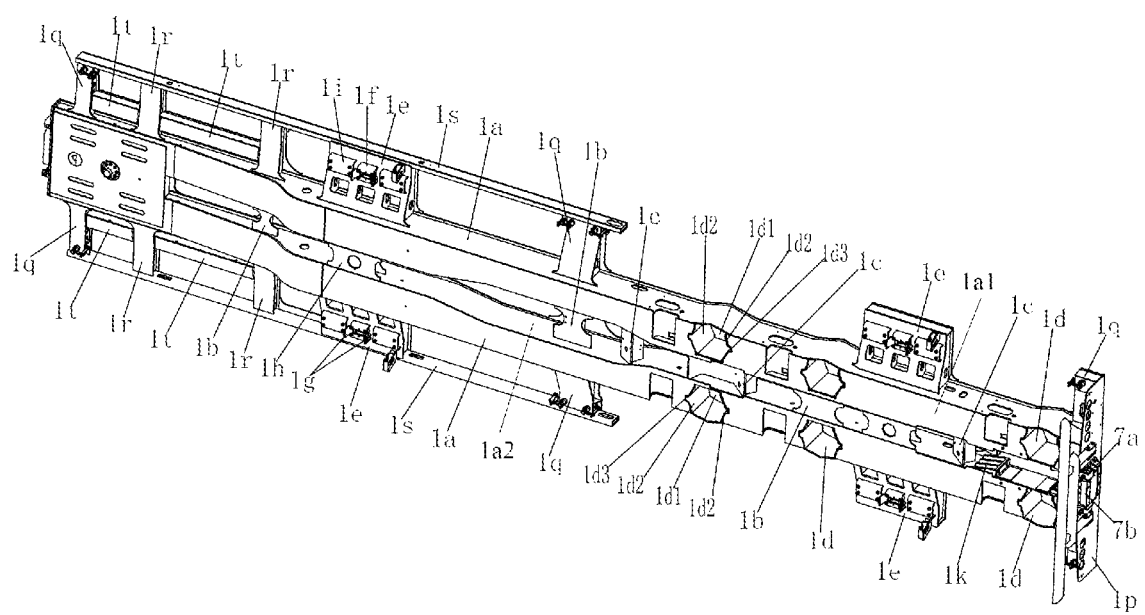
FIG. 12 is a schematic structural diagram of FIG. 9 from a further viewing angle.
Figure 13:
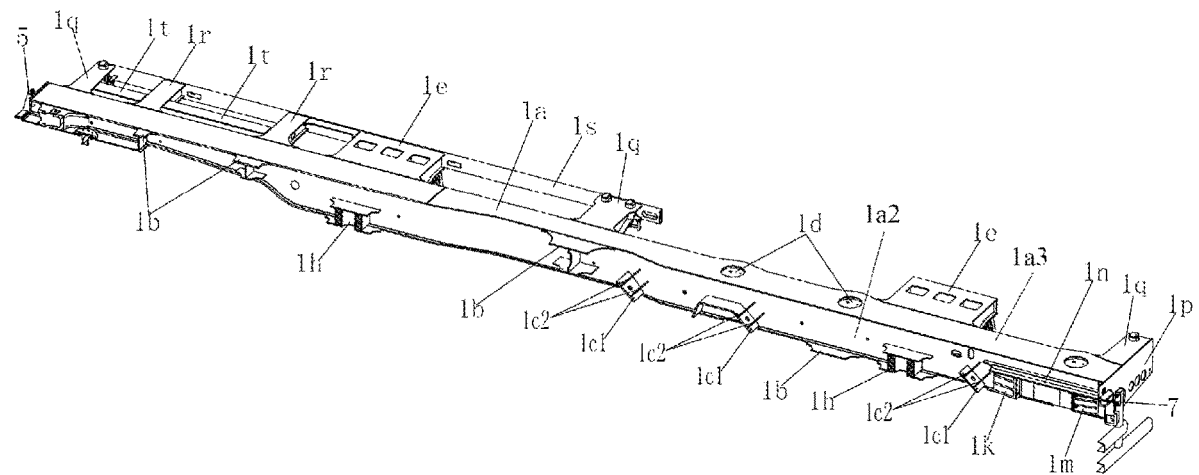
FIG. 13 is a schematic structural diagram of a longitudinal section of the vehicle frame.

As shown in FIGS. 5a, 7 and 12, the above-mentioned load-bearing airbag mounting seat 1d comprises an airbag mounting plate 1d1 and two oppositely arranged airbag partition plates 1d2. Inner surfaces of the upper ends of the two airbag partition plates 1d2 are respectively welded to opposite sides of the airbag mounting plate 1d1. The load-bearing airbag mounting seat 1d is inserted into the load-bearing airbag insertion hole, and the load-bearing airbag mounting seat 1d and two webs of longitudinal beam 1a2 enclose a load-bearing airbag mounting cavity for installing the secondary load-bearing airbag 2e. The airbag mounting plate 1d1 is arranged in parallel with the upper cover plate 1a3 of the longitudinal beam 1a, and lower ends of the two airbag partition plates 1d2 are respectively welded to the lower cover plate 1a1 of the longitudinal beam 1a1. The lower ends of the two airbag partition plates 1d2 are also respectively welded to the two webs of longitudinal beam 1a2. Guide grooves 1d3 protruding outward are provided at middle portions of the two airbag partition plates 1d2 in a vertical direction (see FIG. 23); the supporting seat 2d is provided with bearing seat guide parts 2d1 at two sides thereof, and the bearing seat guide parts 2d1 cooperate with the guide grooves 1d3. The upper cover plate 1a3 of the longitudinal beam 1a is formed with the load-bearing airbag mounting hole at a position corresponding to the load-bearing airbag mounting seat 1d. A top surface of the secondary load-bearing airbag 2e is installed on the airbag mounting plate 1d1. The bearing seat guide part 2d1 (FIG. 21) is movably inserted into the corresponding guide groove 1d3. The mutual cooperation between the added bearing seat guide part 2d and the guide groove 1d3 can ensure longitudinal and lateral positioning, and stable operation of the load-bearing airbag. As shown in FIG. 13, the lifting airbag mounting seat 1c comprises a lifting airbag mounting plate 1c1 and two lifting airbag mounting reinforcement plates 1c2, and the two lifting airbag mounting reinforcement plates 1c2 are installed in parallel between the two longitudinal beams 1a. The lifting airbag mounting plate 1c1 is installed on the two lifting airbag mounting reinforcement plates 1c2. The lifting airbag mounting plate 1c1 is welded to the two longitudinal beams 1a. The two lifting airbag mounting reinforcement plates 1c2 ensure stability of installation of the lifting airbag 2b.

Figure 15:
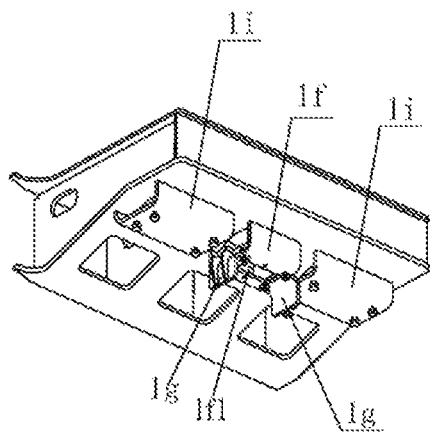
FIG. 15 is a schematic structural diagram of FIG. 14 from another viewing angle.
Figure 16:
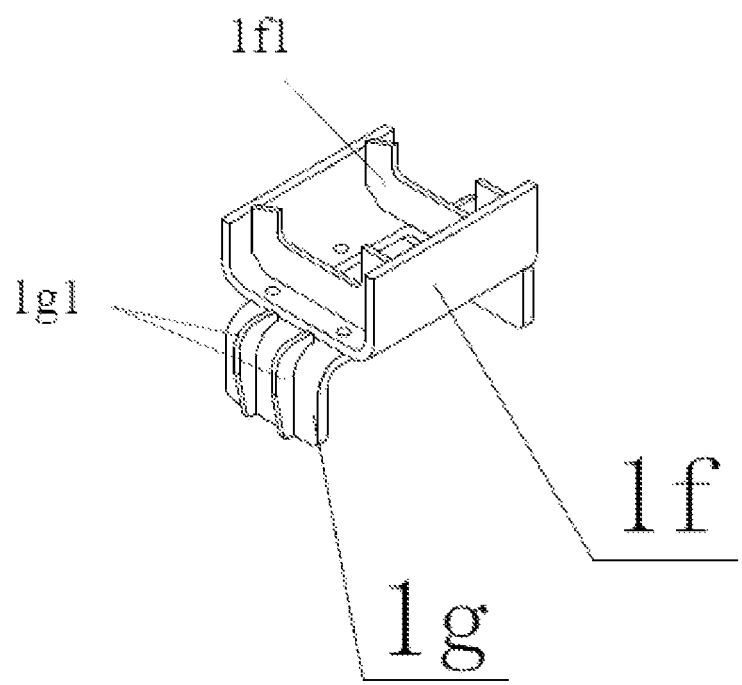
FIG. 16 is a schematic structural diagram showing the positional relationship between the bogie connection seat and the bogie limiting clamping plate.

As shown in FIGS. 15-16, a U-shaped bogie connection seat 1f is provided on a bottom surface of the bearing bolster 1e. A bogie connection seat 1f is formed in a bottom surface of the bogie connection seat 1f in a longitudinal direction. Both ends of the bogie connection seat 1f are respectively provided with a bogie limiting clamping plate 1g. A center plate filler 1h for installing a center plate pin 3a1 of the single-axle bogie 3 is provided between the two longitudinal beams 1a at a position corresponding to the bearing bolster 1e (FIGS. 11-12). 1n some embodiments of the present disclosure, as shown in FIGS. 25-26, the vehicle frame connection assembly 3f comprises one vehicle frame connection plate 3f1, and an upwardly protruding vehicle frame limiting connection seat 3f2 is provided at a middle portion of the vehicle frame connection plate 3f1. The vehicle frame limiting connection seat 3f2 is of a square cavity structure, and a vehicle frame connection long hole 3f3 is formed in a top surface of the vehicle frame limiting connection seat 3f2 in a longitudinal direction. An I-shaped connection member 3f4 is inserted in and limited by the vehicle frame connection long hole 3f3. An upper connection head of the I-shaped connection member 3f4 is inserted in and limited by the reinforcing connection ribs 1f1, and two ends of the upper connection head of the I-shaped connection member 3f4 are fixedly connected the bogie connection seat 1f respectively. The vehicle frame limiting connection seat 3f2 which is of a square cavity structure is clamped between the two bogie limiting clamping plates 1g. The center plate pin 3a1 on the framework 3a is inserted into the center plate filler 1h. The U-shaped bogie connection seat 1f provided on the bottom surface of the bearing bolster 1e facilitates the connection of the vehicle frame connection assembly 3f. At the same time, the cooperation between The bogie limiting clamping plates 1g and the vehicle frame limiting connection seat 3f2 prevents excessive rotation of the bogie, and further ensures reliability of connection between the vehicle frame 1 and the single-axle bogie 3. In addition, The center plate filler 1h can ensure transmission of longitudinal traction force and longitudinal braking force of the train, and further ensure reliability of connection between the vehicle frame 1 and the single-axle bogie 3.

Figure 17:
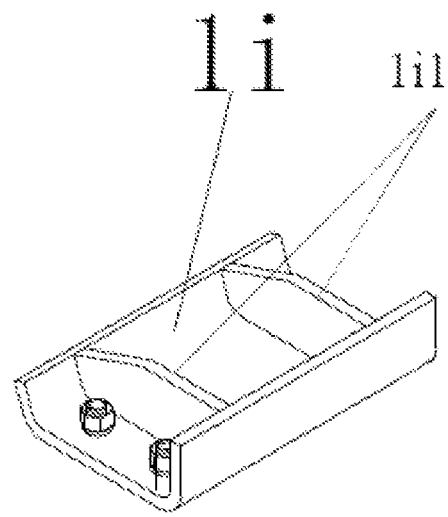
FIG. 17 is a schematic structural diagram of a secondary rubber spring connection seat.

As shown in FIGS. 25-26, a secondary rubber spring assembly 3g is clamped on each of two longitudinal ends of the vehicle frame connection plate 3f1. The secondary rubber spring assembly 3g comprises a secondary rubber spring mounting plate 3g1 and a secondary rubber spring 3g2. A lower end of the secondary rubber spring 3g2 is clamped on the vehicle frame connection plate 3f1, and an upper end of the secondary rubber spring 3g2 is vulcanized on the secondary rubber spring mounting plate 3g1. The secondary rubber spring assembly 3g can play a role of attenuating vertical dynamic force on the one hand, and also play a role for supporting the vehicle body and cargo on the other hand. In some embodiments of the present disclosure, as shown in FIGS. 12, 15, and 17, a U-shaped secondary rubber spring connection seat 1i is provided on a bottom surface of the bearing bolster 1e at a position corresponding to the secondary rubber spring mounting plate 3g1. A bottom surface of the secondary rubber spring connection seat 1i is connected with the secondary rubber spring mounting plate 3g1. By providing the U-shaped secondary rubber spring connection seat 1i on the bottom surface of the bearing bolster 1e, it is convenient to install and fix the secondary rubber spring mounting plate 3g1. In some embodiments of the present disclosure, a top surface of the bogie connection seat 1f and a top surface of the secondary rubber spring connection seat 1i are provided with reinforcing connection ribs 1f1 and 1i1 respectively; the reinforcing connection ribs 1f1 and 1i1 are welded to the bottom surface of the bearing bolster 1e, and an outer side wall of the bogie limiting clamping plate 1g is also provided with the reinforcement connection rib 1g1. By providing the reinforcement connection ribs 1f1 and 1i1 on the top surface of the bogie connection seat 1f and the top surface of the secondary rubber spring connection seat 1i respectively, and welding the reinforcement connection ribs 1f1 and 1i1 to the bottom surface of the bearing bolster 1e, and then providing the reinforcement ribs 1f1 and 1i1 on the outer side wall of the bogie limiting clamping plate 1g, a structural strength of the bogie connection seat can be ensured, which further improves reliability of connection between the vehicle frame 1 and the single-axle bogie 3.

The I-shaped connection member 3f4 and the bogie connection seat 1f are fixedly connected by bolts. When the road-rail dual-purpose vehicle is running on a road, the single-axle bogie 3 is lifted off the rail surface by the I-shaped connection member 3f4; when the road-rail dual-purpose vehicle is running on a railway, the secondary rubber spring 3g2 is compressed, the distance between the vehicle frame 1 and the single-axle bogie 3 is shortened, and the I-shaped connection member 3f4 extends into the cavity of the vehicle frame limiting connection seat 3f2 and does not contact the single-axle bogie 3, thus will not affect the steering function of the single-axle bogie 3, and avoid contact wear of the I-shaped connection member 3f4 and the vehicle frame limiting connection seat 3f2.

The I-shaped connection member 3f4 is inserted into the vehicle frame limiting connection seat 3f2 and the bogie connection seat 1f along the direction of the cavity opening of the vehicle frame limiting connection seat 3f2, and then rotated 90° about a vertical axis to be connected with the bogie connection seat 1f by bolts. In this way, even if the bolt fails, the I-shaped connection member 3f4 will not be separated from the bogie connection seat 1f, which prevents the single-axle bogie 3 from falling off.

As shown in FIG. 25, the brake assembly 3e comprises a unit brake 3e1 and a brake vertical mounting plate 3e2. An upper end of the brake vertical mounting plate 3e2 is installed on the bottom surface of the framework 3a at a position corresponding to a wheel of the wheel-axle assembly 3c. The unit brake 3e1 is installed on a lower end of the brake vertical mounting plate 3e2, and a brake shoe of the unit brake 3e1 is installed facing toward the wheel of the wheel-axle assembly 3c. By using the unit brake 3e1 as a brake, the arrangement of a brake pipeline can be effectively simplified, the structure is more compact, and the installation is more convenient.

Figure 14:
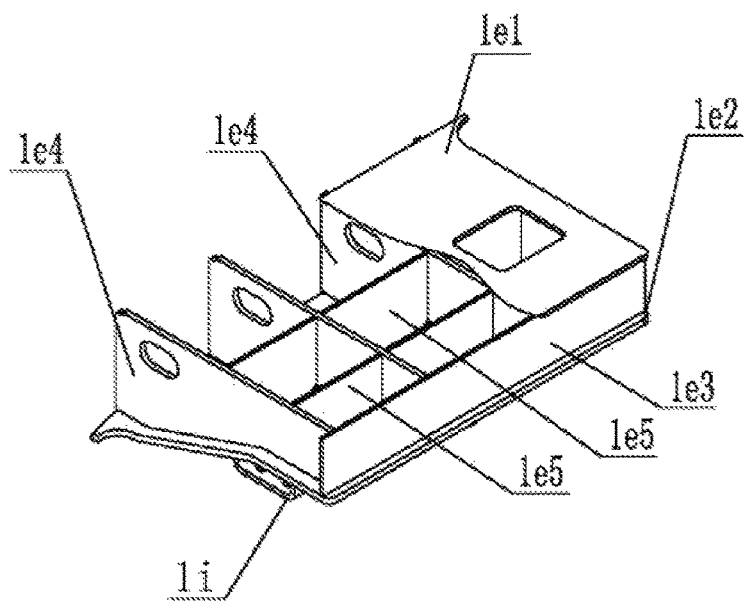
FIG. 14 is a schematic structural diagram of a bearing bolster.

As shown in FIG. 14, the bearing bolster 1e comprises a bearing bolster upper cover plate 1e1, a bearing bolster lower cover plate 1e2, a bearing bolster sealing plate 1e3, bearing bolster webs 1e4 and bearing beam partition plates 1e5. The bearing bolster upper cover plate 1e1 and the bearing bolster lower cover plate 1e2 are arranged up and down in parallel with each other, and the bearing bolster upper cover plate 1e1 and the bearing bolster lower cover plate 1e2 are connected by the bearing bolster webs 1e4 arranged at intervals in a longitudinal direction. Two adjacent bearing bolster webs 1e4 are connected by the bearing bolster partition plates 1e5, and an inner side of the bearing bolster upper cover plate 1e1 and an inner side of the bearing bolster lower cover plate 1e2 are both connected to an outer web of the longitudinal beam 1a. An outer side of the bearing bolster upper cover plate 1e1 and an outer side of the bearing bolster lower cover plate 1e2 are connected by the bearing bolster sealing plate 1e3.

Figure 18:
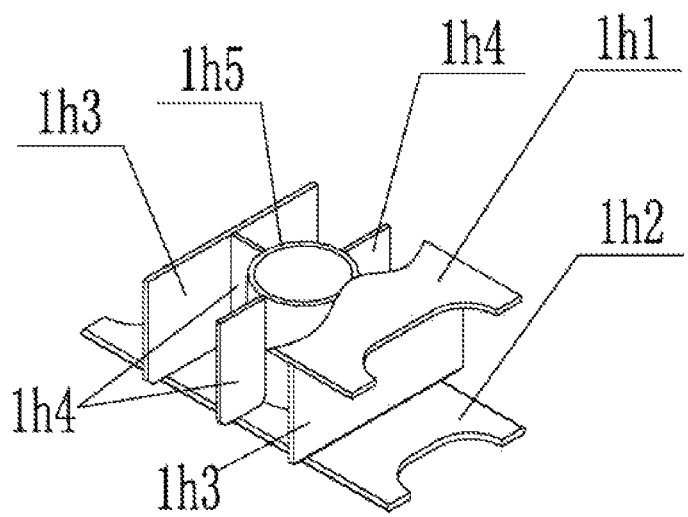
FIG. 18 is a schematic structural diagram of a center plate filler.
Figure 19:
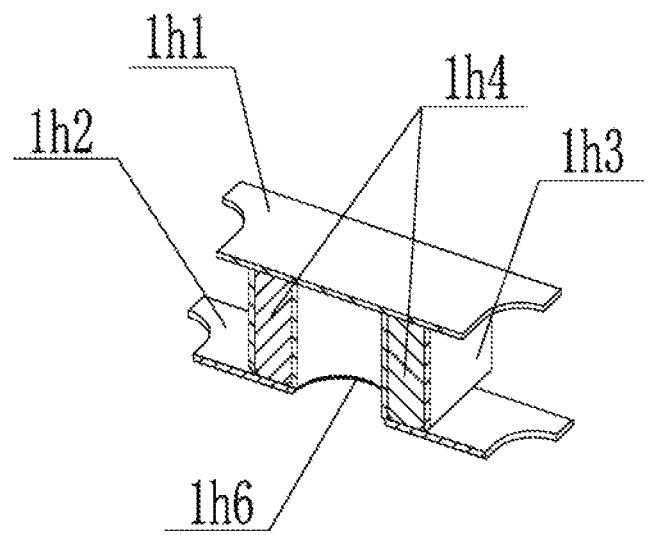
FIG. 19 is a schematic sectional diagram of FIG. 18.

As shown in FIGS. 18-19, the center plate filler 1h comprises a center plate seat upper cover plate 1h1, a center plate seat lower cover plate 1h2, center plate seat webs 1h3, center plate seat partition plates 1h4 and a center plate seat central tube 1h5. The center plate seat upper cover plate 1h1 and the center plate seat lower cover plate 1h2 are arranged up and down in parallel with each other; the center plate seat upper cover plate 1h1 and the center plate seat lower cover plate 1h2 are connected by the center plate seat webs 1h3 arranged at intervals in a longitudinal direction. An upper end of the center plate seat central tube 1h5 is connected to the middle portion of a bottom surface of the center plate seat upper cover plate 1h1, and a lower end of the center plate seat central tube 1h5 is connected to a middle portion of a top surface of the center plate seat lower cover plate 1h2. A center plate pin insertion hole 1h6 is formed in the center plate seat lower cover plate 1h2 at a position corresponding to a lower port of the center plate seat central tube 1h5. The two longitudinal sides of the center plate seat upper cover plate 1h1 are respectively connected to inner webs of the two longitudinal beams 1a, and the two longitudinal sides of the center plate seat lower cover plate 1h2 are respectively connected to lower cover plates 1a1 of the two longitudinal beams 1a. An outer wall of the center plate seat central tube 1h5 is connected to the center plate seat webs 1h3 by the center plate seat partition plates 1h4, and the outer wall of the center plate seat central tube 1h5 is also connected to the inner webs of the two longitudinal beams 1a by the center plate seat partition plate 1h4. By providing the center plate seat partition plates 1h4 between the outer wall of the center plate seat central tube 1h5 and the center plate seat webs 1h3, and providing the center plate seat partition plates 1h4 between the outer wall of the center plate seat central tube 1h5 and the inner webs of the two longitudinal beams 1a, the strength of the center plate filler 1h is greatly improved.

A coupler seat 1j is provided between front ends of the two longitudinal beams 1a (FIGS. 5-6), and a tight-lock coupler 4 is installed inside the coupler seat 1j through a coupler pin. By providing a coupler seat 1j between the front ends of the two longitudinal beams 1a, and installing a tight-lock coupler 4 in the coupler seat 1j through the coupler pin, the connection between the two vehicle bodies is facilitated. As shown in FIGS. 28-35, the tight-lock coupler 4 comprises a coupler body 4a and a coupler knuckle 4b. The coupler body 4a has an internal cavity of coupler body 4c at a position corresponding to a coupler head of the coupler body 4a. The internal cavity of coupler body 4c further comprises a coupler head connection cavity 4c1 and a coupler knuckle rotation cavity 4c2, and the coupler knuckle 4b is rotatably installed in the coupler knuckle rotation cavity 4c2. The tight-lock coupler 4 further comprises an operating lever 4d, a return spring 4e and a return spring mounting bolt 4f. An end of the operating lever 4d is connected to the coupler knuckle 4b; a middle portion of the operating lever 4d is connected to one end of the return spring 4e, and another end of the return spring 4e is connected to the return spring mounting bolt 4f. The return spring mounting bolt 4f is installed on the coupler body 4a. A coupler tail of the coupler body 4a is provided with a coupler connection pin hole 4g cooperating with the coupler pin, and the coupler tail of the coupler body is installed in the coupler seat 1j through the coupler connection pin hole 4g and the coupler pin. By manually operating the operating lever 4d to achieve coupling and decoupling of the tight-lock coupler 4, it can not only meet the marshalling requirements of freight vehicles, but also greatly reduce the cost; at the same time, the coupler tail of the coupler body is installed in the coupler seat directly through the coupler connection pin hole and the coupler pin, so that the structure of the tight-lock coupler is simple, compact, safe and reliable.

A handle 4h is provided at another end of the operating lever 4d. The handle 4h facilitates the operation of the operating lever 4d. An operating lever locking rod 4j with an operating lever locking slot 4i is provided at a middle portion of the operating lever 4d, and the coupler body 4a is provided with an operating lever locking pin 4k cooperating with the operating lever locking slot 4i. The operating lever locking pin 4k has two insertion positions, namely a locking position and an evading position (see two holes shown in FIG. 34). When the two tight-lock couplers 4 are connected, the operating lever locking pin 4k is inserted in the evading position to prevent the operating lever locking pin 4k from interfering with the operating lever locking rod 4j. When the two tight-lock couplers 4 are decoupled, firstly the operating lever 4d is pulled in place, and then the operating lever locking pin 4k is inserted into the locking position, so that the operating lever locking pin 4k is locked in the operating lever locking slot 4i. By providing the operating lever locking rod 4j with an operating lever locking slot 4i at the middle portion of the operating lever 4d, and providing the operating lever locking pin 4k on the coupler body 4a, the operating lever locking pin can restrict the rotation of the coupler knuckle pulled by the return spring when the tight-lock coupler is decoupled, which can realize a direct separation of two couplers and facilitate the decoupling of the tight-lock coupler. An end portion of the operating lever 4d connected to the coupler knuckle 4b is provided with a thread, and the threaded end of the operating lever 4d passes through the coupler knuckle 4b and is connected to the coupler knuckle 4b by a nut. An anti-rotation bump 4m is provided on the operating lever 4d at a position corresponding to the thread, and the coupler knuckle 4b is provided with an anti-rotation slot cooperating with the anti-rotation bump 4m at a corresponding position. The anti-rotation bump 4m can effectively prevent the operating lever 4d from rotating, thereby further facilitating the operation. A return spring connection pin 4n is provided at a middle portion of the operating lever 4d, and the operating lever 4d is connected to the return spring 4e through the return spring connection pin 4n. The return spring 4e is installed by adopting the structure of the return spring connection pin 4n, which facilitates assembly and maintenance of the return spring.

Figure 20:
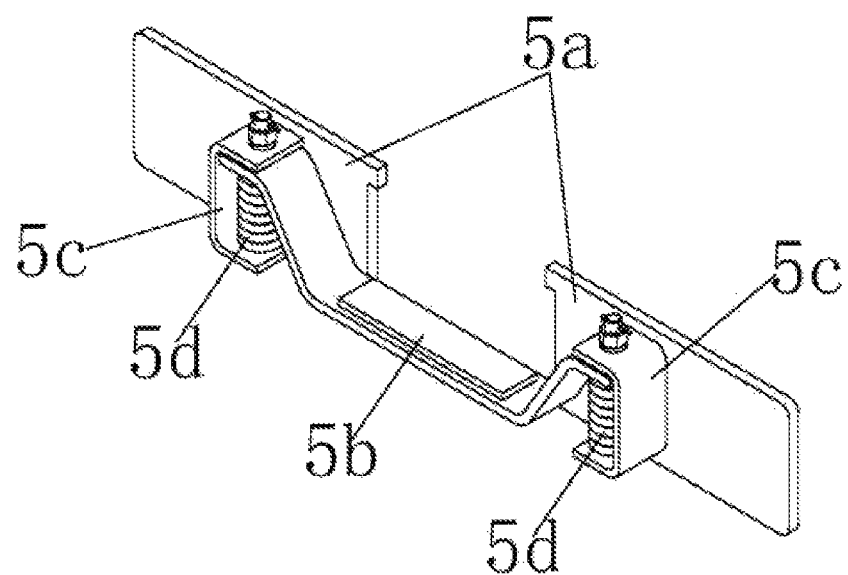
FIG. 20 is a schematic structural diagram of a tight-lock coupler support assembly.
Figure 21:
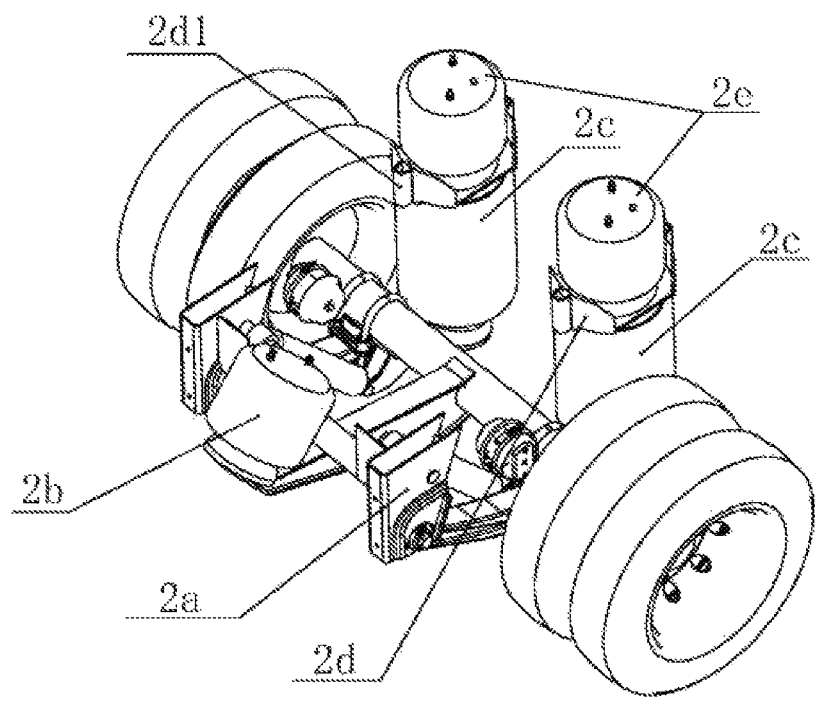
FIG. 21 is a schematic structural diagram of a suspension.
Figure 22:
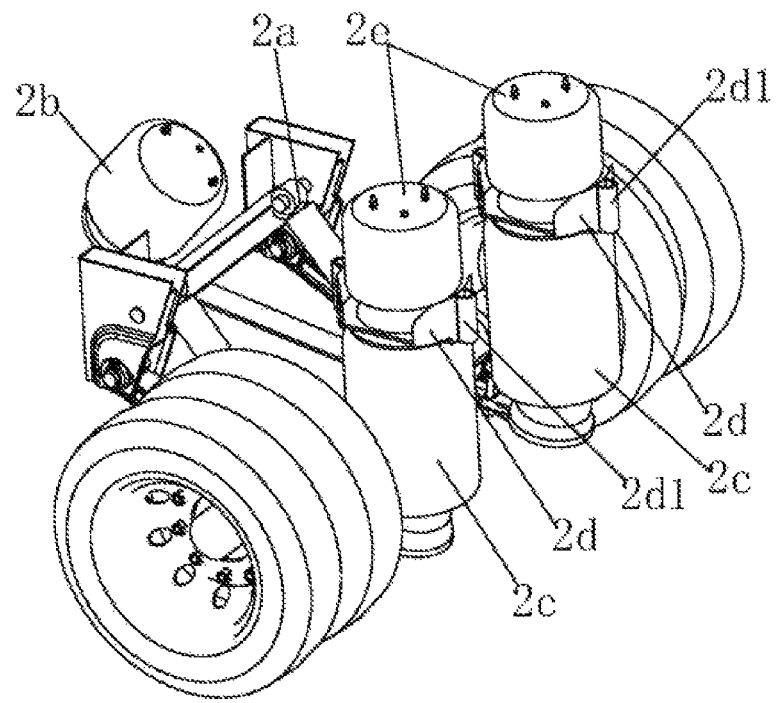
FIG. 22 is a schematic structural diagram of FIG. 21 from another viewing angle.
Figure 23:
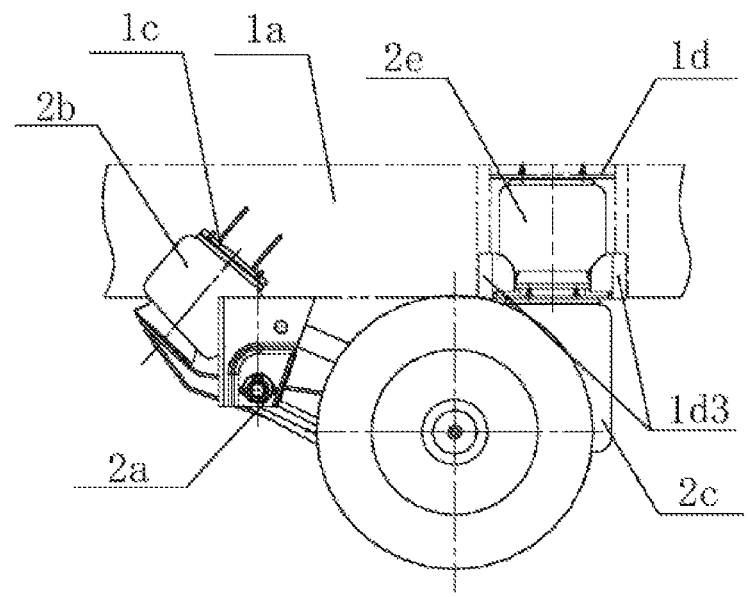
FIG. 23 is a schematic structural diagram showing the suspension in a road bearing position.
Figure 24:
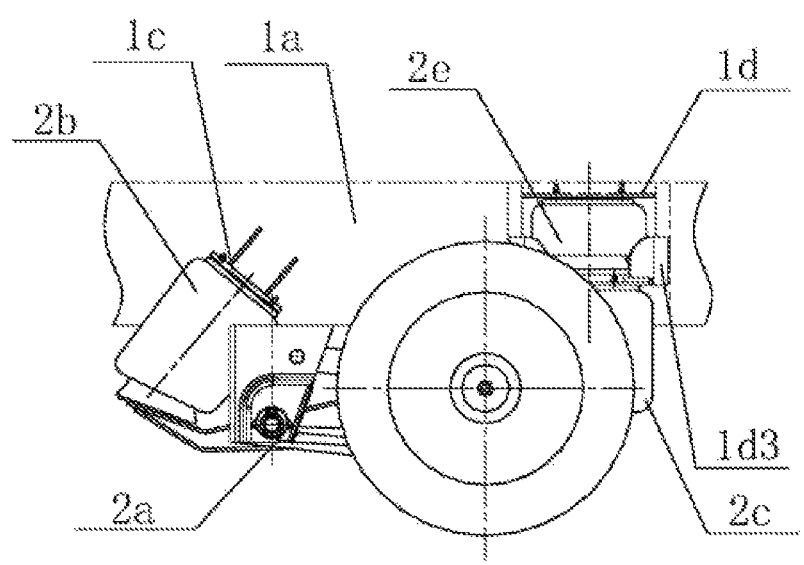
FIG. 24 is a schematic structural diagram showing the suspension in a railway hanging position after lifting.

In some embodiments of the present disclosure, the road-rail dual-purpose vehicle further comprises a tight-lock coupler support assembly 5. Two ends of the tight-lock coupler support assembly 5 are connected to front ends of the two longitudinal beams 1a, respectively, and the tight-lock coupler 4 is supported on the middle portion of the tight-lock coupler support assembly 5. The added tight-lock coupler support assembly 5 improves connection reliability and stability of the tight-lock coupler 4. As shown in FIG. 20, the tight-lock coupler support assembly 5 comprises a U-shaped supporting front end plate 5a, a U-shaped supporting beam 5b, two supporting beam mounting seats 5c and two supporting spring 5d. Two ends of the supporting front end plate 5a are respectively installed on front end surfaces of the two longitudinal beams 1a, and the two supporting beam mounting seats 5c are respectively installed on the two ends of the supporting front end plate 5a correspondingly. The two supporting springs 5d are respectively installed in the two supporting beam mounting seats 5c through supporting pins, and two ends of the supporting beam 5b are respectively press-fitted on upper ends of the two supporting springs 5d. The tight-lock coupler 4 is supported on the supporting beam 5b. The supporting spring 5d can effectively play a role of supporting and adjusting the height of the coupler.

As shown in FIGS. 1-13, an inner web of the longitudinal beam 1a at the rear end thereof is provided with a front draft lug 1k and a rear draft lug 1m, respectively. A coupler anti-creep plate 1n is provided between the two longitudinal beams 1a at a position above the front draft lug 1k and the rear draft lug 1m, and a coupler draft gear 6 is installed between the front draft lug 1k and the rear draft lug 1m. The coupler draft gear 6 facilitates the connection between the vehicle bodies. A rear end plate 1p is installed on rear end surfaces of the two longitudinal beams 1a, and the rear end plate 1p is installed with an impact seat assembly 7 for supporting the coupler draft gear 6. The impact seat assembly 7 improves reliability of connection and stability of the coupler draft gear 6.

Figure 6:
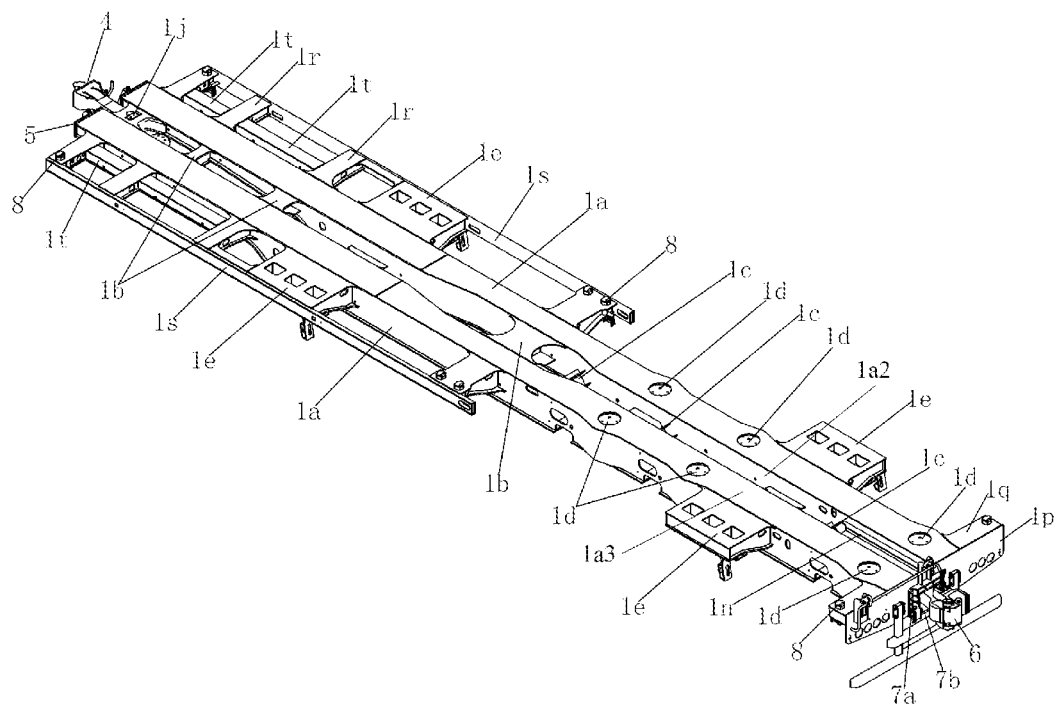
FIG. 6 is a schematic structural diagram of FIG. 5 from another viewing angle.

As shown in FIG. 6, the impact seat assembly 7 comprises a U-shaped impact seat body 7a and a coupler draft gear supporting beam 7b. The impact seat body 7a is installed on the rear end plate 1p and an opening of the impact seat body 7a is arranged facing downward. The coupler draft gear supporting beam 7b is installed at the opening of the impact seat body 7a, and the coupler draft gear 6 rests on the coupler draft gear supporting beam 7b. By designing the impact seat body 7a in a U-shaped structure and sealing with the coupler draft gear supporting beam, installation and disassembly of the coupler draft gear 6 are facilitated.

In some embodiments of the present disclosure, the single-axle bogie 3 is fixedly installed on the vehicle frame 1 through the vehicle frame connection assembly 3f, and the suspension 2 is designed as a two-stage load-bearing airbag with a large stroke. In this way, when changing from railway transportation to road transportation, the single-axle bogie 3 can be lifted directly off the rail surface directly through the suspension 2 with large-stroke without assistance of other equipment, which greatly reduces the transfer time; because the road-rail dual-purpose vehicle of the present disclosure does not need other apparatus to assist in the transfer, the road-rail dual-purpose vehicle just need to carry out road-rail transfer at a railway station with a hardened road bed suitable for the length of the road-rail dual-purpose vehicle, and a surface of the hardened road bed has a same height as a track surface and transited easily to the ground, which greatly reduces the difficulty of road-rail transfer at railway stations; moreover, the bearing bolster 1e not only plays a role of carrying containers, but also plays a role of connecting the vehicle frame 1 and the single-axle bogie 3; the secondary load-bearing airbag 2e is installed in the longitudinal beam 1a through the load-bearing airbag mounting seat 1d, which can increase the stroke of the suspension 2 while making the structure of the road-rail dual-purpose vehicle more compact.

At the same time, the mutual cooperation between The bearing seat guide part 2d1 and the guide groove 1d3 can ensure the longitudinal and lateral positioning of the load-bearing airbag, and make the load-bearing airbag run stably; the two lifting airbag installation reinforcement plates 1c2 ensure stability of installation of the lifting airbag 2b; the U-shaped bogie connection seat 1f provided on the bottom surface of the bearing bolster 1e facilitates the connection of the vehicle frame connection assembly 3f; the cooperation between The bogie limiting clamping plate 1g and the vehicle frame limiting connection seats 3f2 prevents excessive rotation of the bogie, and further ensures reliability of connection between the vehicle frame 1 and the single-axle bogie 3; The center plate filler 1h can ensure transmission of longitudinal traction and longitudinal braking force, and further ensures reliability of connection between the vehicle frame 1 and the single-axle bogie 3; The secondary rubber spring assembly 3g can play a role of attenuating a vertical dynamic force on the one hand, and also play a role for supporting the vehicle body and cargo on the other hand; The U-shaped secondary rubber spring connection seat 1i on the bottom surface of the bearing bolster 1e facilitates installation and fixing of the secondary rubber spring mounting plate 3g1; by providing reinforcement connection ribs 1f1 and 1i1 on the top surface of the bogie connection seat 1f and the top surface of the secondary rubber spring connection seat 1*i* respectively, and welding the reinforcement connection ribs 1*f*1 and 1*i*1 to the bottom surface of the bearing bolster 1*e*, and then providing the reinforcement ribs 1*f*1 and 1*i*1 on the outer side wall of the bogie limiting clamping plate 1*g*, a structural strength of the bogie connection seat can be ensured, which further improves reliability of connection between the vehicle frame 1 and the single-axle bogie 3; by using the unit brake 3*e*1 as a brake, it can effectively simplify the layout of brake pipeline, providing a more compact structure and a more convenient installation; by providing center plate seat partition plates 1*h*4 between the outer wall of the center plate seat central tube 1*h*5 and the center plate seat web 1*h*3, and providing center plate seat partition plates 1*h*4 between the outer wall of the center plate seat central tube 1*h*5 and the inner webs of the two longitudinal beams 1*a*, the strength of the center plate filler 1*h* is greatly improved.

By providing the coupler seat 1*j* between the front ends of the two longitudinal beams 1*a*, and installing the tight-lock coupler 4 in the coupler seat 1*j* through the coupler pin, the connection between the two vehicle bodies is facilitated; by manually operating the operating lever 4*d* to achieve coupling and decoupling of the tight-lock coupler 4, it can not only meet the marshalling requirements of freight vehicles, but also greatly reduce the cost; the coupler tail of the coupler body is installed in the coupler seat 1*j* directly through the coupler connection pin hole 4*g* and the coupler pin, so that the structure of the tight-lock coupler 4 is simple, compact, safe and reliable; by providing the operating lever locking rod 4*j* with the operating lever locking slot 4*i* at the middle portion of the operating lever 4*d*, and providing the operating lever locking pin 4*k* on the coupler body 4*a*, the operating lever locking pin 4*k* can restrict the rotation of the coupler knuckle 4*b* pulled by the return spring 4*e* when the tight-lock coupler 4 is decoupled, which can realize a direct separation of two couplers and facilitate the decoupling of the tight-lock coupler 4; The anti-rotation bump 4*m* can effectively prevent the operating lever 4*d* from rotating, thereby further facilitating the operation; the return spring 4*e* is installed by adopting the structure of the return spring connection pin 4*n*, which facilitates assembly and maintenance of the return spring 4*e*; The tight-lock coupler support assembly 5 improves reliability of connection and stability of the tight-lock coupler 4; The supporting spring 5*d* can effectively play a role of supporting and adjusting the height of the coupler.

The coupler draft gear 6 facilitates the connection between the vehicle bodies; The impact seat assembly 7 improves reliability of connection and stability of the coupler draft gear 6; by designing the impact seat body 7*a* in a U-shaped structure and sealing with the coupler draft gear supporting beam 7*b*, installation and disassembly of the coupler draft gear 6 are facilitated.

Compared with the prior art, the road-rail dual-purpose vehicle provided according to one or more embodiments of the present disclosure have at least the following technical effects or advantages:

1. The single-axle bogie is fixedly installed on the vehicle frame through the vehicle frame connection assembly, and the suspension is designed as a two-stage load-bearing airbag with a large stroke, so that when changing from railway transportation to road transportation, the single-axle bogie can be lifted away from the rail surface directly through the suspension with large-stroke without assistance of other apparatus, which greatly reduces transfer time.
2. Because the road-rail dual-purpose vehicle of the present disclosure does not need other apparatus to assist in the transfer, the road-rail dual-purpose vehicle just need to carry out road-rail transfer at a railway station with a hardened road bed suitable for the length of the road-rail dual-purpose vehicle, and a surface of the hardened road bed has a same height as a track surface and transited easily to the ground, which greatly reduces the difficulty of road-rail transfer at railway stations.
3. The bearing bolster not only plays a role of carrying containers, but also plays a role of connecting the vehicle frame and the single-axle bogie.
4. The secondary load-bearing airbag is installed in the longitudinal beam through the load-bearing airbag mounting seat, which can increase the stroke of the suspension while making the structure of the road-rail dual-purpose vehicle more compact.
5. The mutual cooperation between The bearing seat guide part and the guide groove can ensure longitudinal and lateral positioning of the load-bearing airbag, and make the load-bearing airbag run stably.
6. Two lifting airbag installation reinforcement plates ensure stability of installation of the lifting airbag.
7. The U-shaped bogie connection seat provided on the bottom surface of the bearing bolster facilitates the connection of the vehicle frame connection assembly.
8. The cooperation between The bogie limiting clamping plates and the vehicle frame limiting connection seat prevents excessive rotation of the bogie, and further ensures reliability of connection between the vehicle frame and the single-axle bogie.
9. The center plate filler can ensure transmission of longitudinal traction force and longitudinal braking force of the train, and further ensure reliability of connection between the vehicle frame and the single-axle bogie.
10. The secondary rubber spring assembly can play a role of attenuating a vertical dynamic force on the one hand, and also play a role for supporting the vehicle body and cargo on the other hand.
11. By providing a U-shaped secondary rubber spring connection seat on the bottom surface of the bearing bolster, it is convenient to install and fix the secondary rubber spring mounting plate.
12. By providing reinforcement connection ribs on the top surface of the bogie connection seat and the top surface of the secondary rubber spring connection seat respectively, and welding the reinforcement connection ribs to the bottom surface of the bearing bolster, and then providing the reinforcement ribs on the outer side wall of the bogie limiting clamping plate, a structural strength of the bogie connection seat can be ensured, which further improves reliability of connection between the vehicle frame and the single-axle bogie.
13. By adopting the unit brake as a brake, arrangement of the brake pipeline can be effectively simplified, structure of the brake pipeline is more compact, and installation of the brake pipeline is more convenient.
14. By providing the center plate seat partition plates between the outer wall of the center plate seat central tube and the center plate seat webs, and providing the center plate seat partition plates between the outer wall of the center plate seat central tube and the inner webs of the two longitudinal beams, strength of the center plate filler is greatly improved.

15. By providing the coupler seat between the front ends of the two longitudinal beams, and installing the tight-lock coupler in the coupler seat through the coupler pin, the connection between the two vehicle bodies is facilitated.
16. By manually operating the operating lever to achieve coupling and decoupling of the tight-lock coupler, it can not only meet the marshalling requirements of freight vehicles, but also greatly reduces the cost.
17. The coupler tail of the coupler body is installed in the coupler seat directly through the coupler connection pin hole and the coupler pin, so that the structure of the tight-lock coupler is simple, compact, safe and reliable.
18. By providing the operating lever locking rod with an operating lever locking slot at the middle portion of the operating lever, and providing the operating lever locking pin on the coupler body, the operating lever locking pin can restrict rotation of the coupler knuckle pulled by the return spring when the tight-lock coupler is decoupled, which can realize a direct separation of two couplers and facilitate the decoupling of the tight-lock coupler.
19. The anti-rotation bump can effectively prevent the operating lever from rotating, thereby further facilitating the operation.
20. The return spring is installed by adopting the structure of the return spring connection pin, which facilitates assembly and maintenance of the return spring.
21. The tight-lock coupler support assembly improves reliability of connection and stability of the tight-lock coupler.
22. The supporting spring can effectively play a role of supporting and adjusting the height of the coupler.
23. The coupler draft gear facilitates the connection between the vehicle bodies.
24. The impact seat assembly improves reliability of connection and stability of the coupler draft gear.
25. By designing the impact seat body in a U-shaped structure and sealing with the coupler draft gear supporting beam, installation and disassembly of the coupler draft gear are facilitated.

The foregoing are only preferred embodiments of the present disclosure, and are not intended to limit the present disclosure. Any modification, equivalent replacement, improvement, etc. made within the spirit and principle of the present disclosure shall be covered within the scope of protection of the present disclosure.

The invention claimed is:

1. A road-rail dual-purpose vehicle, comprising a vehicle frame (1), a suspension (2) and a single-axle bogie (3), wherein the vehicle frame (1) comprises two longitudinal beams (1a) arranged in parallel;
the two longitudinal beams (1a) are connected by a longitudinal beam connection plate (1b), and a lifting airbag mounting seat (1c) is provided between the two longitudinal beams (1a);
a load-bearing airbag insertion hole is formed on a lower cover plate (1a1) of the longitudinal beam (1a) at a position corresponding to the lifting airbag mounting seat (1c);
a load-bearing airbag mounting seat (1d) is installed in the load-bearing airbag insertion hole, and a bearing bolster (1e) is installed on an outer side of the longitudinal beam (1a);
the suspension (2) comprises an axle assembly (2a); a lifting airbag (2b) is installed in the middle portion of the axle assembly (2a) at a front end thereof, and a primary load-bearing airbag (2c) is installed on either side of the axle assembly (2a) at a rear end thereof;
a secondary load-bearing airbag (2e) is installed on a top surface of each of two primary load-bearing airbags (2c) through a supporting seat (2d);
a top surface of the lifting airbag (2b) is installed on the lifting airbag mounting seat (1c), and a top surface of the secondary load-bearing airbag (2e) is installed in the load-bearing airbag mounting seat (1d);
the single-axle bogie (3) comprises a framework (3a), and an axle box (3b) is installed on a bottom surface of the framework (3a) at each end thereof;
a wheel-axle assembly (3c) is installed between the two axle boxes (3b), and a primary damping spring assembly (3d) is provided between the axle box (3b) and the framework (3a);
a brake assembly (3e) is installed at each of two ends of the bottom surface of the framework (3a) at a position corresponding to a wheel of the wheel-axle assembly (3c);
a vehicle frame connection assembly (3f) is provided at each of two ends of a top surface of the framework (3a), and the framework (3a) is installed on a bottom surface of the bearing bolster (1e) through the vehicle frame connection assembly (3f),
wherein a coupler seat (1j) is provided between front ends of the two longitudinal beams (1a), and a tight-lock coupler (4) is installed inside the coupler seat (1j) through a coupler pin.

2. The road-rail dual-purpose vehicle according to claim 1, wherein the load-bearing airbag mounting seat (1d) comprises an airbag mounting plate (1d1) and two oppositely arranged airbag partition plates (1d2);
inner surfaces of upper ends of the two airbag partition plates (1d2) are respectively welded to opposite sides of the airbag mounting plate (1d1);
the load-bearing airbag mounting seat (1d) is inserted into the load-bearing airbag insertion hole, and the load-bearing airbag mounting seat (1d) and two webs of longitudinal beam (1a2) enclose a load-bearing airbag mounting cavity for installing the secondary load-bearing airbag (2e);
the airbag mounting plate (1d1) is arranged in parallel with an upper cover plate (1a3) of the longitudinal beam (1a), and lower ends of the two airbag partition plates (1d2) are respectively welded to the lower cover plate (1a1) of the longitudinal beam (1a);
the lower ends of the two airbag partition plates (1d2) are also respectively welded to the two webs of longitudinal beams (1a2), and guide grooves (1d3) protruding outward are provided at middle portions of the two airbag partition plates (1d2) in a vertical direction;
the supporting seat (2d) is provided with bearing seat guide parts (2d1) at two sides thereof, and the bearing seat guide parts (2d1) cooperate with the guide grooves (1d3);
the upper cover plate (1a3) of the longitudinal beam (1a) is formed with the load-bearing airbag mounting hole at a position corresponding to the load-bearing airbag mounting seat (1d); and
a top surface of the secondary load-bearing airbag (2e) is installed on the airbag mounting plate (1d1), and the bearing seat guide part (2d1) is movably inserted in a corresponding guide groove (1d3).

3. The road-rail dual-purpose vehicle according to claim 1, wherein the lifting airbag mounting seat (1c) comprises a lifting airbag mounting plate (1c1) and two lifting airbag mounting reinforcement plates (1c2);

the two lifting airbag mounting reinforcement plates (1c2) are installed in parallel between the two longitudinal beams (1a); and the lifting airbag mounting plate (1c1) is installed on the two lifting airbag mounting reinforcement plates (1c2), and the lifting airbag mounting plate (1c1) is welded to the two longitudinal beams (1a).

4. The road-rail dual-purpose vehicle according to claim 1, wherein a U-shaped bogie connection seat (10 is provided on a bottom surface of the bearing bolster (1e), and a bogie connection long hole (1f1) is formed in a bottom surface of the bogie connection seat (10 in a longitudinal direction;

both ends of the bogie connection seat (10 are respectively provided with a bogie limiting clamping plate (1g), and a center plate filler (1h) for installing a center plate pin (3a1) of the single-axle bogie (3) is provided between the two longitudinal beams (1a) at a position corresponding to the bearing bolster (1e);

the vehicle frame connection assembly (3f) comprises one vehicle frame connection plate (3f1), and an upwardly protruding vehicle frame limiting connection seat (3f2) is provided at a middle portion of the vehicle frame connection plate (3f1);

the vehicle frame limiting connection seat (3f2) is of a square cavity structure, and a vehicle frame connection long hole (3f3) is formed in a top surface of the vehicle frame limiting connection seat (3f2) in a longitudinal direction;

an I-shaped connection member (3f4) is inserted in and limited by the vehicle frame connection long hole (3f3); an upper connection head of the I-shaped connection member (3f4) is inserted in and limited by the bogie connection long hole (1f1), and two ends of the upper connection head of the I-shaped connection member (3f4) are fixedly connected to the bogie connection seat (10 respectively; and the vehicle frame limiting connection seat (3f2) which is of a square cavity structure is clamped between the two bogie limiting clamping plates (1g), and the center plate pin (3a1) on the framework (3a) is inserted into the center plate filler (1h).

5. The road-rail dual-purpose vehicle according to claim 4, wherein a secondary rubber spring assembly (3g) is clamped on each of two longitudinal ends of the vehicle frame connection plate (3f1), and the secondary rubber spring assembly (3g) comprises a secondary rubber spring mounting plate (3g1) and a secondary rubber spring (3g2); and a lower end of the secondary rubber spring (3g2) is clamped on the vehicle frame connection plate (3f1), and an upper end of the secondary rubber spring (3g2) is vulcanized on the secondary rubber spring mounting plate (3g1).

6. The road-rail dual-purpose vehicle according to claim 5, wherein a U-shaped secondary rubber spring connection seat (1i) is provided on a bottom surface of the bearing bolster (1e) at a position corresponding to the secondary rubber spring mounting plate (3g1), and a bottom surface of the secondary rubber spring connection seat (1i) is connected with the secondary rubber spring mounting plate (3g1).

7. The road-rail dual-purpose vehicle according to claim 6, wherein a top surface of the bogie connection seat (1f) and a top surface of the secondary rubber spring connection seat (1i) are provided with reinforcement connection ribs (1f1, 1i1) respectively; and the reinforcement connection ribs (1f1, 1i1) are welded to the bottom surface of the bearing bolster (1e), and an outer side wall of the bogie limiting clamping plate (1g) is also provided with the reinforcement connection rib (1g1).

8. The road-rail dual-purpose vehicle according to claim 4, wherein the center plate filler (1h) comprises a center plate seat upper cover plate (1h1), a center plate seat lower cover plate (1h2), center plate seat webs (1h3), center plate seat partition plates (1h4) and a center plate seat central tube (1h5);

the center plate seat upper cover plate (1h1) and the center plate seat lower cover plate (1h2) are arranged up and down in parallel with each other; the center plate seat upper cover plate (1h1) and the center plate seat lower cover plate (1h2) are connected by the center plate seat webs (1h3) arranged at intervals in a longitudinal direction;

an upper end of the center plate seat central tube (1h5) is connected to a middle portion of a bottom surface of the center plate seat upper cover plate (1h1), and a lower end of the center plate seat central tube (1h5) is connected to a middle portion of a top surface of the center plate seat lower cover plate (1h2);

a center plate pin insertion hole (1h6) is formed in the center plate seat lower cover plate (1h2) at a position corresponding to a lower port of the center plate seat central tube (1h5), and two longitudinal sides of the center plate seat upper cover plate (1h1) are respectively connected to inner webs of the two longitudinal beams (1a);

two longitudinal sides of the center plate seat lower cover plate (1h2) are respectively connected to lower cover plates (1a1) of the two longitudinal beams (1a), and an outer wall of the center plate seat central tube (1h5) is connected to the center plate seat webs (1h3) by the center plate seat partition plates (1h4); and the outer wall of the center plate seat central tube (1h5) is also connected to the inner webs of the two longitudinal beams (1a) by the center plate seat partition plates (1h4).

9. The road-rail dual-purpose vehicle according to claim 1, wherein the brake assembly (3e) comprises a unit brake (3e1) and a brake vertical mounting plate (3e2);

an upper end of the brake vertical mounting plate (3e2) is installed on a bottom surface of the framework (3a) at a position corresponding to a wheel of the wheel-axle assembly (3c); and the unit brake (3e1) is installed on a lower end of the brake vertical mounting plate (3e2), and a brake shoe of the unit brake (3e1) is arranged facing toward the wheel of the wheel-axle assembly (3c).

10. The road-rail dual-purpose vehicle according to claim 1, wherein the bearing bolster (1e) comprises a bearing bolster upper cover plate (1e1), a bearing bolster lower cover plate (1e2), a bearing bolster sealing plate (1e3), bearing bolster webs (1e4) and bearing bolster partition plates (1e5);

the bearing bolster upper cover plate (1e1) and the bearing bolster lower cover plate (1e2) are arranged up and down in parallel with each other, and the bearing bolster upper cover plate (1e1) and the bearing bolster lower cover plate (1e2) are connected by the bearing bolster webs (1e4) arranged at intervals in a longitudinal direction;

two adjacent bearing bolster webs (1e4) are connected by the bearing bolster partition plates (1e5), and an inner side of the bearing bolster upper cover plate (1e1) and an inner side of the bearing bolster lower cover plate (1e2) are both connected to an outer web of the longitudinal beam (1a); and an outer side of the bearing bolster upper cover plate (1e1) and an outer side of the bearing bolster lower cover plate (1e2) are connected by the bearing bolster sealing plate (1e3).

11. The road-rail dual purpose vehicle according to claim 1, wherein an inner web of the longitudinal beam (1a) at the rear end thereof is provided with a front draft lug (1k) and a rear draft lug (1m) respectively; and a coupler anti-creep plate (1n) is provided between the two longitudinal beams (1a) at a position above the front draft lug (1k) and the rear draft lug (1m), and a coupler draft gear (6) is installed between the front draft lug (1k) and the rear draft lug (1m).

12. The road-rail dual-purpose vehicle according to claim 11, wherein a rear end plate (1p) is installed on rear end surfaces of the two longitudinal beams (1a), and the rear end plate (1p) is installed with an impact seat assembly (7) for supporting the coupler draft gear (6).

13. The road-rail dual-purpose vehicle according to claim 12, wherein the impact seat assembly (7) comprises a U-shaped impact seat body (7a) and a coupler draft gear supporting beam (7b);

the impact seat body (7a) is installed on the rear end plate (1p), and an opening of the impact seat body (7a) is arranged facing downward; and the coupler draft gear supporting beam (7b) is installed at the opening of the impact seat body (7a), and the coupler draft gear (6) rests on the coupler draft gear supporting beam (7b).

14. The road-rail dual-purpose vehicle according to claim 1, wherein the tight-lock coupler (4) comprises a coupler body (4a) and a coupler knuckle (4b), and the coupler body (4a) has an internal cavity of coupler body (4c) at a position corresponding to a coupler head of the coupler body (4a);

the internal cavity of coupler body (4c) comprises a coupler head connection cavity (4c1) and a coupler knuckle rotation cavity (4c2), and the coupler knuckle (4b) is rotatably installed in the coupler knuckle rotation cavity (4c2);

the tight-lock coupler (4) further comprises an operating lever (4d), a return spring (4e) and a return spring mounting bolt (4f), and an end of the operating lever (4d) is connected to the coupler knuckle (4b);

a middle portion of the operating lever (4d) is connected to one end of the return spring (4e), and another end of the return spring (4e) is connected to the return spring mounting bolt (4f);

the return spring mounting bolt (4f) is installed on the coupler body (4a), and a coupler tail of the coupler body (4a) is provided with a coupler connection pin hole (4g) cooperating with the coupler pin; and the coupler tail of the coupler body (4a) is installed in the coupler seat (1j) through the coupler connection pin hole (4g) and the coupler pin.

15. The road-rail dual-purpose vehicle according to claim 14, wherein a handle (4h) is provided at another end of the operating lever (4d).

16. The road-rail dual-purpose vehicle according to claim 14, wherein an operating lever locking rod (4j) with an operating lever locking slot (4i) is provided at a middle portion of the operating lever (4d), and the coupler body (4a) is provided with an operating lever locking pin (4k) cooperating with the operating lever locking slot (4i).

17. The road-rail dual-purpose vehicle according to claim 14, wherein an end portion of the operating lever (4d) connected to the coupler knuckle (4b) is provided with a thread, and the threaded end of the operating lever (4d) passes through the coupler knuckle (4b) and is connected to the coupler knuckle (4b) by a nut.

18. The road-rail dual-purpose vehicle according to claim 14, wherein an anti-rotation bump (4m) is provided on the operating lever (4d) at a position corresponding to the thread, and the coupler knuckle (4b) is provided with an anti-rotation slot cooperating with the anti-rotation bump (4m) at a corresponding position.

19. The road-rail dual-purpose vehicle according to claim 14, wherein a return spring connection pin (4n) is provided at a middle portion of the operating lever (4d), and the operating lever (4d) is connected to the return spring (4e) through the return spring connection pin (4n).

20. The road-rail dual-purpose vehicle according to claim 14, further comprising a tight-lock coupler support assembly (5); wherein two ends of the tight-lock coupler support assembly (5) are connected to front ends of the two longitudinal beams (1a) respectively, and the tight-lock coupler (4) is supported on the middle portion of the tight-lock coupler support assembly (5).

21. The road-rail dual-purpose vehicle according to claim 20, wherein the tight-lock coupler support assembly (5) comprises a supporting front end plate (5a), a U-shaped supporting beam (5b), two supporting beam mounting seats (5c) and two supporting springs (5d), two ends of the supporting front end plate (5a) are respectively installed on front end surfaces of the two longitudinal beams (1a), and the two supporting beam mounting seats (5c) are respectively installed on the two ends of the supporting front end plate (5a) correspondingly;

the two supporting springs (5d) are respectively installed in the two supporting beam mounting seats (5c) through supporting pins; and two ends of the supporting beam (5b) are respectively press-fitted on upper ends of the two supporting springs (5d), and the tight-lock coupler (4) is supported on the supporting beam (5b).

* * * * *